US011443099B2

(12) United States Patent
Lepeska et al.

(10) Patent No.: US 11,443,099 B2
(45) Date of Patent: Sep. 13, 2022

(54) TIME-DEPENDENT MACHINE-GENERATED HINTING

(71) Applicant: VIASAT, INC., Carlsbad, CA (US)

(72) Inventors: Peter J Lepeska, Boston, MA (US); Devin R Toth, Quincy, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/962,927

(22) Filed: Apr. 25, 2018

(65) Prior Publication Data
US 2018/0248970 A1 Aug. 30, 2018

Related U.S. Application Data

(63) Continuation of application No. PCT/US2015/057847, filed on Oct. 28, 2015.

(51) Int. Cl.
*G06F 16/951* (2019.01)
*G06F 40/14* (2020.01)
(Continued)

(52) U.S. Cl.
CPC ............ *G06F 40/14* (2020.01); *G06F 16/951* (2019.01); *G06F 16/9566* (2019.01);
(Continued)

(58) Field of Classification Search
CPC ............ H04L 67/2847; H04L 67/2852; G06F 12/123; G06F 17/30899; G06F 17/30902; G06F 17/30864
See application file for complete search history.

(56) References Cited

U.S. PATENT DOCUMENTS 6,085,193 A    7/2000   Malkin et al.
6,622,168 B1   9/2003   Datta
(Continued)

FOREIGN PATENT DOCUMENTS

CN    102063505 A    5/2011
CN    102446222 A    5/2012
(Continued)

OTHER PUBLICATIONS

International Search Report and Written Opinion mailed in International (PCT) Application No. PCT/US2015/057847 dated Jun. 21, 2016, 11 pgs.
(Continued)

*Primary Examiner* — Tom Y Chang
(74) *Attorney, Agent, or Firm* — Chang & Hale LLP

(57) ABSTRACT

Embodiments seek to improve prefetch hinting using time-dependent, machine-generated hints. Some embodiments operate in context of client machines in communication hinting machines that can develop information about whether and how resources are used in network transactions over time by collecting "resource samples." Each resource sample can identify rendering status information of a resource at a sample time. The time-based samples can be used to compute time-based probabilities for the resources, indicating, for example, the likelihood of a resource being used to render a web page at some subsequent time. Time-dependent hints can be generated as a function of the time-based probabilities, and the time-dependent hints can be used to improve prefetching by optimizing the hinting information with respect to a particular request time (e.g., the prefetching hints for rendering a web page can be generated in a manner that accounts for when the web page is being rendered).

28 Claims, 11 Drawing Sheets

(51) Int. Cl.
*G06F 16/958* (2019.01)
*G06F 16/955* (2019.01)
*G06F 16/957* (2019.01)
*H04L 67/5681* (2022.01)

(52) U.S. Cl.
CPC ........ *G06F 16/9574* (2019.01); *G06F 16/986* (2019.01); *H04L 67/5681* (2022.05)

(56) References Cited

U.S. PATENT DOCUMENTS

| | | | |
|---|---|---|---|
| 7,769,742 B1 * | 8/2010 | Brawer | G06F 17/30864 707/709 |
| 8,335,838 B2 | 12/2012 | Zhang et al. | |
| 8,341,245 B1 | 12/2012 | Roskind et al. | |
| 8,478,843 B1 | 7/2013 | Ortlieb et al. | |
| 8,775,775 B1 * | 7/2014 | Ekambaram | G06F 12/0862 707/674 |
| 8,984,048 B1 | 3/2015 | Maniscalco et al. | |
| 9,037,638 B1 | 5/2015 | Lepeska et al. | |
| 9,083,583 B1 | 7/2015 | Roskind et al. | |
| 9,083,584 B2 | 7/2015 | Lee | |
| 9,106,607 B1 | 8/2015 | Lepeska et al. | |
| 9,135,364 B1 | 9/2015 | Sundaram et al. | |
| 9,613,158 B1 | 4/2017 | Lepeska | |
| 2002/0010761 A1 | 1/2002 | Carneal et al. | |
| 2005/0192936 A1 * | 9/2005 | Meek | G06F 17/30864 |
| 2008/0016115 A1 | 1/2008 | Bahl et al. | |
| 2008/0091711 A1 * | 4/2008 | Snodgrass | H04L 67/2847 |
| 2008/0114773 A1 | 5/2008 | Choi et al. | |
| 2009/0112975 A1 | 4/2009 | Beckman et al. | |
| 2012/0059869 A1 | 3/2012 | Seo et al. | |
| 2013/0031459 A1 | 1/2013 | Khorashadi et al. | |
| 2013/0226992 A1 * | 8/2013 | Bapst | H04L 67/10 709/203 |
| 2013/0246508 A1 * | 9/2013 | McCanne | H04L 67/42 709/203 |
| 2013/0297561 A1 | 11/2013 | Mizrotsky et al. | |
| 2014/0108369 A1 | 4/2014 | Nijjer | |
| 2014/0149850 A1 * | 5/2014 | Khorashadi | G06F 40/14 715/235 |
| 2014/0189071 A1 * | 7/2014 | Leighton | H04L 67/2847 709/219 |
| 2014/0215001 A1 * | 7/2014 | Tucek | H04W 4/18 709/213 |
| 2014/0310229 A1 * | 10/2014 | Lahav | G06Q 30/02 706/52 |
| 2014/0373032 A1 * | 12/2014 | Merry | G06F 9/4843 719/328 |
| 2014/0379840 A1 * | 12/2014 | Dao | H04L 67/2847 709/213 |
| 2015/0067174 A1 * | 3/2015 | Crowe | H04L 67/2842 709/226 |
| 2015/0081906 A1 * | 3/2015 | Backholm | H04W 74/06 709/225 |
| 2015/0156194 A1 | 6/2015 | Modi et al. | |
| 2015/0186545 A1 * | 7/2015 | Krutzler | G06F 16/9574 715/234 |
| 2015/0193395 A1 | 7/2015 | Nicolaou et al. | |
| 2015/0200994 A1 | 7/2015 | Jain et al. | |
| 2015/0295988 A1 * | 10/2015 | Goodwin | H04L 67/02 709/203 |
| 2015/0350370 A1 | 12/2015 | Lepeska et al. | |
| 2016/0004674 A1 * | 1/2016 | Ostroumova | H04L 67/02 715/205 |
| 2016/0191664 A1 * | 6/2016 | Balakrishnan | H04L 67/2857 709/203 |
| 2016/0275190 A1 * | 9/2016 | Seed | H04W 4/70 |
| 2017/0034302 A1 * | 2/2017 | Han | H04L 67/2842 |
| 2019/0312943 A1 * | 10/2019 | Garas | H04L 67/2842 |

FOREIGN PATENT DOCUMENTS

| | | |
|---|---|---|
| CN | 102907093 A | 1/2013 |
| CN | 102957712 A | 3/2013 |
| CN | 103353886 A | 10/2013 |
| CN | 103761293 A | 4/2014 |
| CN | 104113626 A | 10/2014 |
| CN | 104137104 A | 11/2014 |
| WO | WO-2017/074359 A1 | 5/2017 |

OTHER PUBLICATIONS

International Preliminary Report on Patentability mailed in International (PCT) Application No. PCT/US2015/057847 dated May 11, 2018, 8 pgs.

Examination Report mailed in European Patent Application No. 15793980.2 dated Feb. 19, 2019, 7 pgs.

* cited by examiner

TIME-DEPENDENT MACHINE-GENERATED HINTING

FIELD

Embodiments relate generally to network communications performance, and, more particularly, to time-dependent, machine-driven hint generation.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of resources (e.g., page objects) and multiple request/response round-trip communications from the user system to one or more web servers that are providing resources for the web page. Additionally, each resource may be associated with a number of different phases as part of the inclusion of the resource (or an object associated with the resource) in a web page that is presented to a user. Each resource that is part of a web page and each phase associated with each resource may contribute to an overall page load time that is experienced by a device user as delay. Various techniques permit information to be sent to browsers regarding the resources used to render a web page ("hints"), and the browsers can use those hints to improve the loading time for that web page.

BRIEF SUMMARY

Among other things, systems and methods are described for improving prefetch hinting using time-dependent, machine-generated hints. Some embodiments operate in context of client machines having page fetchers (e.g., implemented in web browsers) in communication (e.g., over a communications network) with content servers and hinting machines. The hinting machines can develop information about whether and how resources are used in network transactions (e.g., to render web pages) over time by collecting "resource samples." The samples can be collected as part of receiving hinting requests from client machines, as part of receiving hinting feedback from client machines, as information monitored and/or generated during automated crawling of web pages, and/or in any other suitable manner. Each resource sample can identify rendering status information of the resource at the time the sample was collected (i.e., the sample time). For example, the resource sample can identify whether the resource was loaded as part of rendering a web page, when the resource was loaded in context of other resources on the page, and/or any other information describing whether and how the resource was loaded in relation to rendering the web page at the sample time.

In such contexts, where the resource samples correspond to particular sample times, the resource samples can be considered as "time-based samples." The time-based samples can be used to compute time-based probabilities for the resources (e.g., as instantaneous probabilities at a particular time, as probability functions over time, etc.). Such probabilities can indicate, for example, the likelihood of a resource being used to render a web page at some subsequent time, and can be used to generate time-dependent hints. In some implementations, the time-dependent hints can be used to improve prefetching by optimizing the hinting information with respect to a particular request time (i.e., the hints are generated in a manner that accounts for when the web page is being rendered). In other implementations, the time-dependent hints can permit client machines to generate their own hints on demand, even when access to a hinting machine is unavailable (and/or external hinting information is otherwise unavailable). For example, embodiments can receive a hinting request at a request time, and generate and communicate time-dependent hints based on the time-based probabilities and the request time. Other implementations and features involving time-dependent hints are described more fully herein.

BRIEF DESCRIPTION OF THE DRAWINGS

The present disclosure is described in conjunction with the appended figures.

Figure 1:
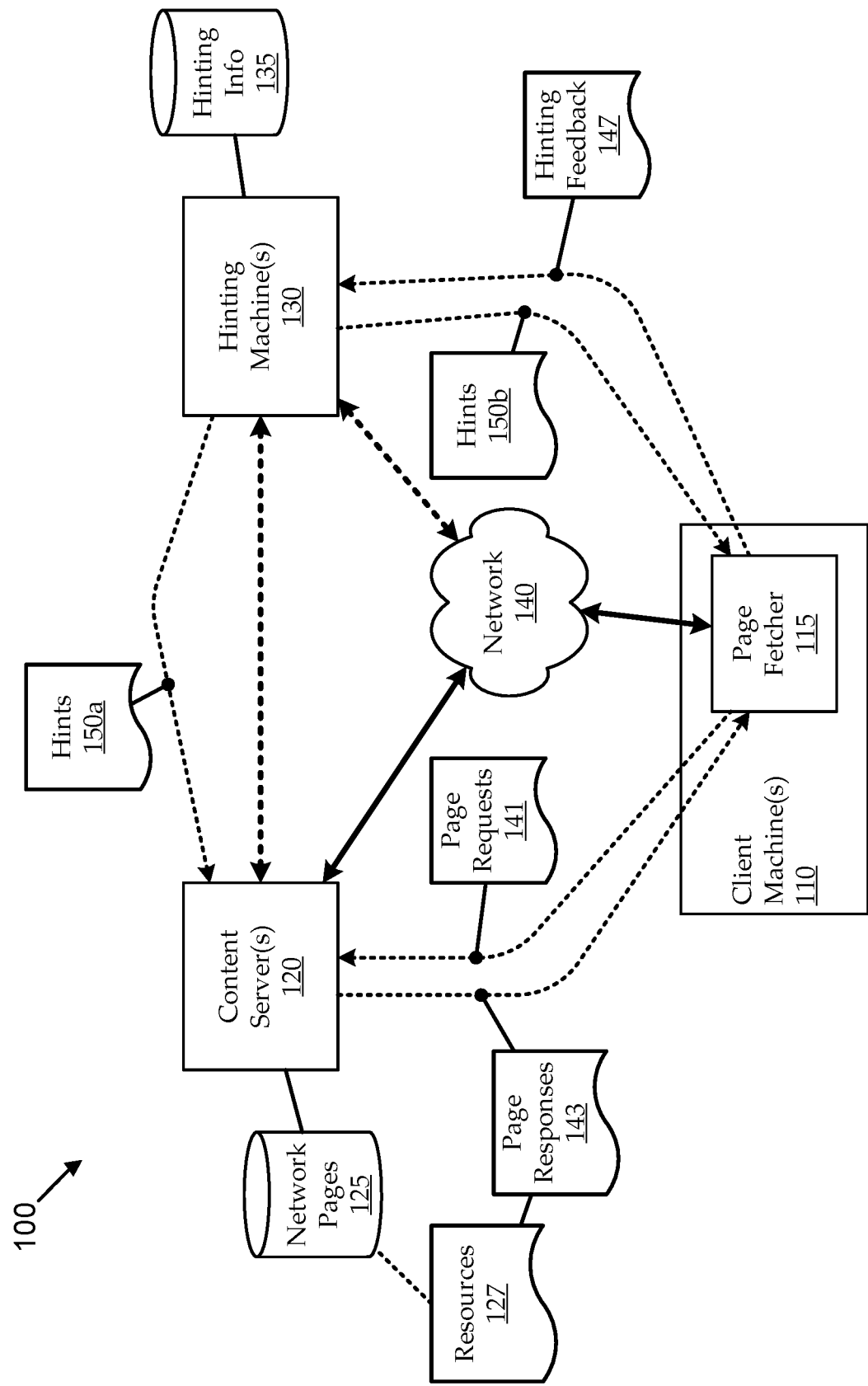
FIG. 1 shows an illustrative communications system environment that provides a context for various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Embodiments operate in context of machine-driven hint generation that provides time-dependent hints based on accumulated resource samples collected over time from one or more "client" machines. As used herein, a "client" or "client machine" is generally intended to include any computational platform involved in a web transaction, such as rendering a web page, and is not intended to be limited to any particular network architecture, protocol, etc. For example, in some implementations, a client machine can interact with a server machine (e.g., a hinting machine) in a "client-server" context, such as a client-server architecture using client-server types of protocols. Other implementations can operate in a peer-to-peer context, or any other suitable context. In such contexts, a particular machine can act as a client for a particular transaction, and as a server or other function in other transactions (e.g., the same machine can operate as a "client" for one transaction and as a server for another transaction, according to peer-to-peer and/or other protocols).

As used herein, "web page transaction" generally refers to a communication between a client machine and another machine (e.g., a server computer) to transfer a plurality of objects to the client machine which may be presented to a user as part of a web page. As used herein, a "web page" is intended to broadly refer to any type of page sent over a communications network and consisting of multiple page resources. For example, the web page can be a typical web page used in World Wide Web communications, a page (e.g., screen) of an application (e.g., an app, etc.), or any other type of web page. Further, reference to "web" is not intended to be limited to the Internet or the World Wide Web; rather, the "web" can include any public or private communications network. Further, terms like "page fetcher," "page renderer," or "page loader," as used herein, are not intended to be limited to any particular process in a web browser; rather such terms can refer to any process or set of processes used to load and/or render an end-user experience of a web page and its resources in a browser or other application (i.e., "render" and "load" are used herein to generally express formulating the page using the resources). In one example, the web pages can include web browser pages; the page fetcher can include a web browser; and the resources can include uniform resource locators (URLs), hypertext markup language (HTML) objects, scripts, cookies, and/or other server-side objects used (e.g., needed in some or all instances) by the web browser to render the web pages. In another example, the web pages can include screens of an app (e.g., or any other application); the page fetcher can include the app (e.g., the portion of the app that handles input/output interactions); and the resources can be audio-visual content of the rendered screens.

Embodiments operate on "resources" and samples of resources. As used herein, the term "resource" refers generally to any of a data element (e.g., a file, script, etc.), a collection of data elements (e.g., a web page, etc.), or an identifier of a data element or collection of data elements (e.g., a uniform resource locator (URL), script call, etc.). In some instances, resources can be embedded in other resources and/or can include collections of other resources. Embodiments of "resource samples" generally indicate a respective resource (e.g., by referring to the resource's identifier) along with resource status information, but do not generally include the underlying data element or elements themselves.

Embodiments are described in context of "hints," "hinting information," and the like. As used herein, hints generally include any information about the resources used to render a web page that are provided to a page fetcher (or any suitable component of a client machine or a proxy system of the client machine) to help improve the page load timing for that web page by that page fetcher. This information may include a list of all resources requested as part of the transaction, a list of resources needed to present an initial incomplete web page on an output of a client device, a set of cookies (and/or hashed versions of those cookies) associated with the client device or processing operating on the client device, a set of cookies (and/or hashed versions of those cookies) associated with one or more web page resources or client processes, a set of timings associated with each resource, a set of timings associated with the overall page rendering process, a set of relationships between the resources, details associated with cached resources, resource sizes, resource types, resource fingerprints or checksums, resource position on the page, cookie meta-data, redirect chains, alternative content sources used during a transaction such as content delivery networks (CDNs) that may be used for some resources, details of the domains (including number of objects that are expected to be fetched per domain) used during the transaction, secure connection meta-data, secure socket layer (SSL) server certificate and/or revocation list information, and/or any other such details.

In various embodiments, after a page fetcher has completed rendering a web page and/or presenting the web page to a user, it can provide hinting feedback information that can include and/or be used to derive any hinting information for subsequent web page transactions (e.g., including any of the hinting information described above). The feedback information can be captured in any suitable manner, including by a client machine, by a page fetcher operating on a client device, by a web server, by a proxy server in a communication path between a client device and a web server, by an automated page fetcher under control of the a hinting service, or by any other device involved with a web page transaction. The hints can be used to improve web page loading times in web page transactions. For example, the improvement can be realized by lowering an overall time from a user selection via the page fetcher to a completed presentation of a web page to a user in response to that selection. This improvement can also be realized by lowering an initial time to presentation of an incomplete version of the web page that may be functional for user purposes. In one potential embodiment, a lowering of the overall time may result from the use of latency information in conjunction with other feedback information to determine how aggressively a page fetcher will attempt to prefetch child resources as part of future instances of the web page transaction.

Examples of hints and feedback information may be found in U.S. patent application Ser. No. 14/729,949, titled "SERVER BASED EMBEDDED WEB PAGE FEEDBACK AND PERFORMANCE IMPROVEMENT"; U.S. patent application Ser. No. 13/372,347, titled "BROWSER BASED FEEDBACK FOR OPTIMIZED WEB BROWSING"; U.S. Pat. No. 9,037,638, titled "ASSISTED BROWSING USING HINTING FUNCTIONALITY"; U.S. patent application Ser. No. 14/212,538, titled "FASTER WEB BROWSING USING HTTP OVER AN AGGREGATED TCP TRANSPORT"; U.S. patent application Ser. No. 14/276,936, titled "CACHE HINTING SYSTEMS"; and U.S. patent application Ser. No. 14/729,949, titled "SERVER-MACHINE-DRIVEN HINT GENERATION FOR IMPROVED WEB PAGE LOADING USING CLIENT-MACHINE-DRIVEN FEEDBACK"; each of which is expressly incorporated by reference for all purposes in this application.

Resources used in such a web page may include HTML files, cascading style sheet (CSS) files, image files, video files, or any other such files. Reference to different instances of a web page transaction refers to the transaction being performed by different client machines at different times, or the same transaction being performed by a single client machine at different times. These different instances of a web page transaction may include variations in the resources that are part of the web page transaction, either due to customization across different client machines, or updates to the web page over time. Further, different web pages and different web page transactions may include resources that are the same or similar. In certain embodiments, feedback information and hints generated for a resource seen in one web page transaction may be applied as hints in a transaction for a separate web page if the root URLs are similar or if there is a sufficient degree of commonality between the sets of resources is used in both web page transactions. Similarly, as used herein, terms, like "render" and "load" are used broadly (and, in most cases, interchangeably) to refer generally to enabling interaction by a user with a page resource via a page fetcher interface. For example, rendering or loading can include displaying and/or formatting in context of static visual content, playing in context of video or audio content, executing in context of code or other scripts, etc.

Further, as used herein, "root" refers to an initial portion of a web page transaction that is initiated directly by a user selection or action or is predicted to be initiated by user action. For example, a user clicking on a web page link initiates a root request for that link. The root response is the response directly responding to that root request. The root response also includes a root resource. This root resource includes information that enables a page fetcher to identify, either directly or indirectly, the other resources needed to render and present the complete web page. In some instances, the "root" resource can include a primary child resource (e.g., a sub-resource) in an iframe on a page, or the like (e.g., where each of multiple iframes are separately hinted from different content servers).

"Redirect" refers to a response to a root request that directs the requesting client device to a single resource that has at least one sub-resource. For example, a client device may send a root request and receive back a redirect response. The client device may then send a redirected child request to the redirect target indicated in the redirect response. In certain embodiments, a response to the redirected child request may then include a feedback script or hints. Thus, while certain embodiments describe operation with a root request and response, in various embodiments, any root, child, or redirected response described herein may include a feedback script as described in the various embodiments herein.

"Child" requests and responses are the follow-on requests and responses that result, either directly or indirectly, from embedded or calculated references to other resources in root resources or other child resources. The child resources, requests, and responses are always one or more steps removed from the user action by a root that directly responds to the user action. Child resources may include references to additional child resources, resulting in a chain of requests and responses. Each of the above requests and responses may be hypertext transport protocol (HTTP) requests and responses including HTTP headers and an associated message. In various embodiments, other communication protocols may be used.

FIG. 1 shows an illustrative communications system environment 100 that provides a context for various embodiments. The communications system environment 100 includes client machine(s) 110, content server(s) 120 (e.g., web servers), and hinting machine(s) 130 in communication over a communications network 140. Network 140 can include any one or more suitable communications networks and/or communications links, including any wide area network (WAN), local area network (LAN), private network, public network (e.g., the Internet), wired network, wireless network, etc. Typically, the communications system environment 100 can include many client machines 110 interfacing with multiple content servers 120 over the communications network 140.

As described herein, according to various embodiments, the content servers 120 can be in communication with one or more hinting machines 130 directly and/or via the communications network 140, and/or the client machines 110 can be in communication with the hinting machines 130 directly and/or via the communications network 140 (e.g., at the direction of the content servers). Some embodiments are directed to improving the loading and rendering of resources that make up web pages, screens of applications, and/or other similar web page contexts. In such a context, it may be typical for a client machine 110 to make a request for a web page that is provided (e.g., hosted) by a content server 120. Loading and rendering the requested web page can involve subsequently requesting and receiving a number (sometimes a large number) of resources that make up the web page (e.g., visual content, audio content, executable scripts, etc.). Loading and rendering of such a web page can be improved by requesting resources at particular times (e.g., by prefetching resources in a particular order, etc.), and the client machine can be instructed as to such improvements using "hints," as described herein. The resources may be identified in the set of hints by URL, by a combination of URL and regular expression, by a script, or by other similar techniques. Loading and rendering of such a web page can also be improved by hints that support pre-resolving domain names, pre-establishing TCP connections, pre-establishing secure connections, predetermining and minimizing the redirect chain and similar functions that can be performed prior to content load that improve overall page load performance. Additionally, the probability that a resource will be needed and the priority it should be given by the browser may be communicated to further improve page load time. Additionally, the various image, video, and document formats that may be associated with a given resource may be sent to the device in advance as hints, thereby allowing the renderer to dynamically adjust to network conditions and constraints and minimize data traffic associated with prefetched resources. Additionally, hints may guide the selection of CDNs, caches, or other server locations so as to improve page load time.

Client machine(s) 110 can be implemented as any suitable computing device having memory resources, processing resources, and network communication resources. For example, the client machines 110 can be desktop computers, tablet computers, laptop computers, mobile phones, personal data assistants, network enabled wearable devices, network enabled home appliances, etc. Each client machine 110 includes one or more page fetchers 115. Page fetcher 115 can include any system implemented in a client machine 110 that enables a web page transaction, and that is used, at least in part, for rendering a web page and presenting it to a user via an output device of the client machine 110.

Content server(s) 120 can generally include any one or more computational environments for serving (e.g., hosting and/or otherwise providing access to) web page content to the client machines 110 via the communications network 140. For example, the content servers 120 can include web servers, content distribution networks (CDNs), caches, or the like. As illustrated, the content servers 120 can include, or be in communication with, one or more data storage systems having web pages 125 stored thereon. As described herein, it is assumed that the web pages 125 are made up of multiple resources 127. For example, loading one of the web pages 125 can involve requesting, receiving, and rendering the resources 127 that make up the web page 125. Some or all of the resources 127 of the web pages 125 served by the content servers 120 can be stored in the data storage systems, or some or all of the resources 127 can be stored remote from the content servers 120.

The one or more hinting machines 130 can be implemented as one or more stand-alone server computers, as part of one or more content servers 120, and/or in any other suitable manner for maintaining and updating hinting information 135 (e.g., according to hinting feedback 147 from client machines 110, according to hints 150 computed from the hinting information 135, etc.). The hinting information 135 can be stored in one or more data stores that are part of, coupled with, or in communication with the hinting machines 130, or in any other suitable manner. Embodiments support many different types of hinting information 135 and hints 150 generated therefrom, including, for example, information relating to which page objects 127 are needed to render the web pages 125, timing information relating to those page objects 127 (e.g., the order and timing by which the page objects 127 should be requested), etc. The hinting information 135 can be maintained, computed, updated, etc. in any suitable manner, including according to the hinting feedback 147 received from one or more client machines 110. Embodiments of the hinting machine 130 apply machine learning techniques to hinting feedback 147 from multiple related web page transactions (e.g., from multiple instances of multiple client machines 110 rendering the same (or sufficiently similar) web pages). Received hinting feedback 147 can be used to refine, hone, update, reinforce, or otherwise improve machine-driven hinting models maintained by the hinting machine 130, thereby facilitating generation and communication of optimized hints.

The client machines 110 can render requested web pages 125 according to hints 150 generated from the hinting information 135 that effectively predict which resources 127 the client machines 110 will need at which times to optimally render the web pages 125; the client machines 110 can actually render the web pages 125 according at least to the received hints 150; the actual rendering of the web pages 125 can be monitored by the client machines 110 to determine which resources 127 were actually used to render the pages according to which timings; and the monitored information can be fed back (i.e., as the hinting feedback 147) to the hinting machines 130 for use in updating the hinting information 135 and refining future hint 150 generation. The hints 150 can be generated for, and/or applied to rendering of, a particular web page 125 from which the hints were derived, other web pages 125 from the same or a similar domain, web pages 125 differing by only a portion of their path (or by dynamically generated fields, etc.), etc. For example, hinting information 135 (e.g., from time-based samples) gathered from a particular web page 125 may suggest time-dependency trends and/or other information with respect to all web pages in a particular domain (e.g., "breakingnews.com" pages have a banner at the top of the page that is the same across all pages in the domain and rarely changes, and they have a main story image that is in the same location with different content on every page in the domain, or the like).

Some embodiments generate and handle hints in a manner that is computationally generated (e.g., generated by machine based on feedback and analysis, as opposed to being generated manually by coders based on assumptions). As described herein, such machine-generated hinting can be enhanced by adding time dependency to the hinting. Embodiments of the hinting machines 130 can develop information about whether and how resources are used in network transactions (e.g., to render web pages) over time by collecting resource samples. The samples can be collected as part of receiving hinting requests (e.g., as part of page requests 141) from client machines, as part of receiving hinting feedback 147 from client machines, as information monitored and/or generated during automated crawling of web pages (e.g., by the hinting machine 130 itself), and/or in any other suitable manner. The time-based samples can be used to compute time-based probabilities for the resources, which can be used to generate time-dependent hints.

Figure 2A:
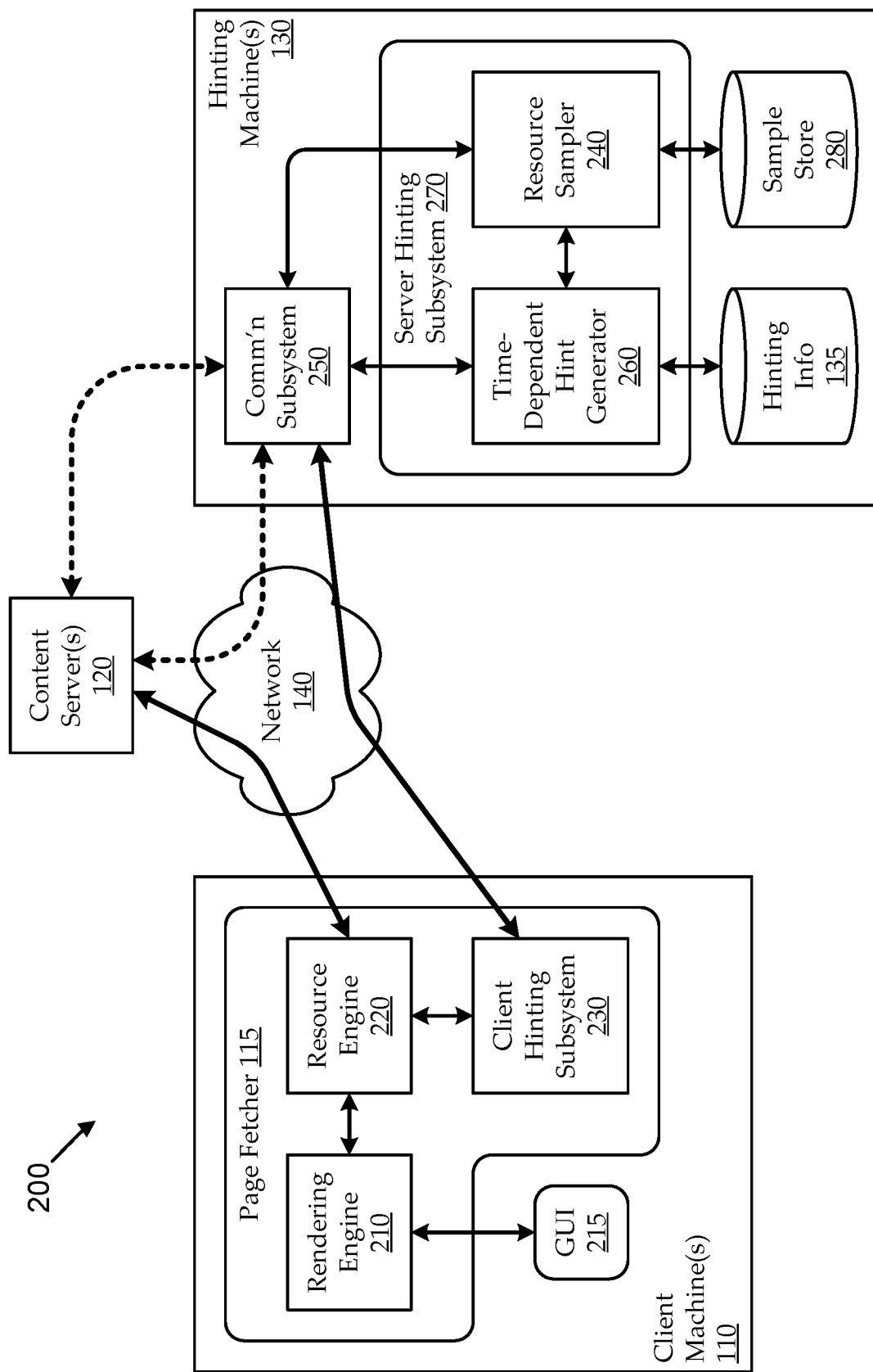
FIG. 2A shows a block diagram of a portion of an illustrative communications environment for implementing time-dependent hint generation, according to various embodiments.

FIG. 2A shows a block diagram of a portion of an illustrative communications environment 200a for implementing time-dependent hint generation, according to various embodiments. FIG. 2 shows a client machine 110 in communication with a hinting machine 130 over a network 140, which can be an implementation of the system described above with reference to FIG. 1. Some of the descriptions involve communications between components of the client machine 110 and components of the hinting machine 130, however these are intended only as a general illustrations of functionality and connectivity. As described with reference to FIG. 1, and as generally shown in FIG. 2, the hinting machine 130 can be in direct communication (over the network 140) with the client machine 110, in communication with the client machine 110 only via one or more content servers 120 (e.g., where the hinting machine 130 is in communication with the content servers 120 over one or more networks 140 and/or is part of one or more of the content servers 120), in communication with one or more content servers 120 and the client machine 110 over one or more networks 140, etc. For example, hinting functionality can be handled between the client machine 110 and the hinting machine 130 either without involving any content servers 120, only by going through one or more content servers 120, or in any suitable combination.

As illustrated, the client machine 110 can include a page fetcher 115, such as a web browser. Embodiments of the page fetcher 115 can include a rendering engine 210, a resource engine 220, and a client hinting subsystem 230. The rendering engine 210 can render resources of a web page for consumption (e.g., display, etc.) via a graphical user interface (GUI) 215 of the client machine 110. For example, the rendering engine 210 can process HTML code, scripts, page objects, etc. to effectively provide a user experience of web pages via the GUI 215.

When a web page is requested, the resource engine 220 can generate requests for resources of the requested web page, communicate those requests to one or more content servers 120 over the network 140, receive the resources in response to the requests, and process the responses. For the sake of illustration, a user can request a web page via the GUI 215 (e.g., by entering a web address), the resource engine 220 can obtain some or all of the resources needed to render the requested web page (e.g., according to HTML code, scripts, cookies, page objects, etc.), and the rendering engine 210 can process the obtained resources to effectively provide a user experience of the requested web page via the GUI 215 (by rendering the web page using the resources).

Embodiments of the page fetcher 115 can exploit hints, as described herein, using the client hinting subsystem 230. Hinting functionality can be exploited at any or all of a number of stages in a web transaction. One stage is a web page request stage, during which various resource requests can be made to one or more content servers 120 (e.g., by the resource engine 220), and requests comparable to those resource requests can be made to the client hinting subsystem 230 for hints relating to those resources (e.g., by the client hinting subsystem 230). For example, in response to a user requesting a web page (or in response to predicting that a user will request a web page), the resource engine 220 can begin requesting resources (e.g., the resources pertaining to the root URL and child URLs), and the client hinting subsystem 230 can issue one or more requests indicating those resources' URLs to the hinting machine 130 seeking relevant hints. Another stage is a feedback stage. While the resources for a web page are being loaded, while the page is being rendered, etc., the client hinting subsystem 230 can collect feedback information, as described above (e.g., information on which resources are involved in rendering the web page, timing information relating to the resources, etc.). After the web page has been rendered by the rendering engine 210 (or during rendering, after presentation to the user via the GUI 215, after multiple pages have been rendered and feedback has been aggregated, or at any other suitable time), the client hinting subsystem 230 can send the hinting feedback to the hinting machine 130 for use in generating future hints for the web page and/or for the resources (e.g., for any web pages that invoke those resources).

Machine-generation of hints by the hinting machine 130 can generally involve aggregating and maintaining information about how and when resources are used to render web pages. For example, a hinting service can use so-called "waterfall data" from multiple past visits to a web page to compute a probability that a given resource (e.g., a child URL of the web page) will be used in a future visit. One technique for computing such a probability is to divide a number of occurrences of a given resource by a number of visits to the web page on which the resource is used, effectively yielding a likelihood that the resource will subsequently be used to render the web page. The probability can be refined by more strongly weighting presence or absence of a resource in more recent visits, for example, under the assumption that more recently sampled pages are less likely to have changed (e.g., even assuming that web pages change over time, it can generally be assumed that those changes are less likely to have occurred when less time has elapsed). However, such probabilities do not record, or account for, actual time-dependencies of the resources on a page. For example, some resources can change much more or less frequently than others, and such changes can exhibit certain periodicity or other temporal characteristics, can indicate temporal characteristics of other related resources, etc. Embodiments described herein accumulate time-based information about resource rendering from which to develop and exploit time-based hinting probabilities and time-dependent hints. Such time-dependent hinting can provide a number of features, as described herein.

Embodiments of the hinting machine 130 include a server hinting subsystem 270, which can include a resource sampler 240 and a time-dependent hint (TDH) generator 260. The resource sampler 240 can receive resource samples and can store the resource samples in a sample data store 280. In some embodiments, the resource sampler 240 can receive resource samples by monitoring web transactions involving client machines 110 (e.g., and/or involving machines, such as proxies, acting on behalf of client machines 110). For example, when a client machine 110 issues a hinting request, provides hinting feedback, visits a web page, etc., the resource sampler 240 can monitor which resources were used to render the web page and timing information relating to loading those resources. In other embodiments, the server machine 130 (e.g., the resource sampler 240) can perform automated resource sampling. For example, the resource sampler 240 can include, and/or direct operation of, one or more "bots," or the like, that can autonomously crawl web pages and collect resource samples. Such automated approaches can include any suitable functionality for collecting resource samples, such as full browser instances, partial browser instances, etc. In some implementations, the automated browser approaches can model functionality of multiple types of browsers and/or multiple types of rendering platforms (e.g., for different operating systems, mobile versus desktop environments, etc.).

Each resource sample is recorded at a corresponding sample time and indicates a rendering status of the resource with respect to rendering a web page at the corresponding sample time (and the resource sample may be received at the sample time or at some subsequent time). The rendering status can include any information relating to the rendering of the resource in one or more web transaction contexts (e.g., on one or more web pages). For example, when a user visits a news-related web page at a first time, multiple resources can be loaded, including text, images, videos, scripts, etc. Some of the resources relate to relatively static content of the web page (e.g., data elements giving rise to the overall look and feel of the page), and other resources are relatively dynamic content of the web page (e.g., data elements relating to a particular news story, advertising banners, etc.). Accordingly, when the user visits the same page at a second time, some of the resources (e.g., the more dynamic resources on the page) may have changed since the first time. Thus, the rendering status can indicate which resources were loaded at which sample times.

Some embodiments of the resource sampler 240 can collect additional rendering status information about the resources as part of sample collection. Some implementations associate each sampled resource with one or more super-resources and/or sub-resources. For example, a group of resources can be child URLs of a particular logical context (e.g., web page, resource domain, root domain, etc.), and implementations can store those resources in association with their logical context; or a particular resource can be a script or page that calls one or more child resources, and implementations can store the resource with such an indication. Other implementations can store information in association with resource samples, such as file type, one or more resource indicators (e.g., a URL, one or more URLs identified as pointing to an equivalent resource, etc.), resource rendering properties (e.g., size relative to a web page, location on the web page, interactivity with user devices and/or other resources on the web page, etc.). For example, a web page can be laid out in such a way that the top ten percent of the page has content that never changes, the left ten percent of the page has content that changes on the first day of each month, and the remainder of the page has highly dynamic content.

The TDH generator 260 can calculate, as a function of the stored resource samples, a time-based probability of each resource being fetched over time as part of rendering the web page. As resource samples are collected over time, some or all of the samples (e.g., rendering status of resources at sample times) can be added to statistical models. The statistical model effectively computes a probability that a particular resource will be rendered in association with a particular web transaction at a particular time (or times) in the future as a function of whether (e.g., and how, when, etc.) the resource was rendered in association with other web transactions at previous sample times. FIGS. 3 and 4A-4D show some examples of time-based resource probability information for use with various embodiments.

Figure 3:
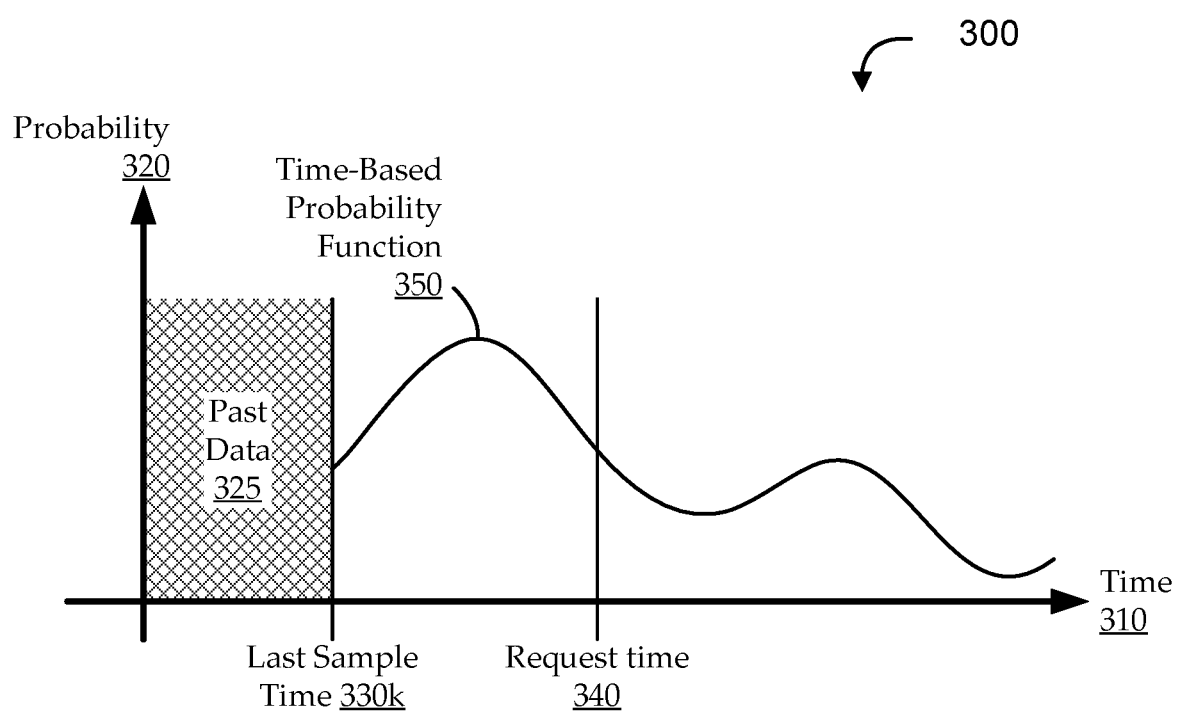
FIG. 3 shows an example graph of a time-based probability function for an illustrative resource.

FIG. 3 shows an example graph 300 of a time-based probability function 350 (i.e., probability 320 versus time 310) for an illustrative resource. It is assumed that a number of samples were collected over a previous timeframe and were stored as "past data" 325. Based on the past data 325, the time-based probability function 350 can be computed and plotted. For example, the past data 325 can be used to compute a statistical trend curve. As illustrated, the past data 325 can include some or all samples of a particular resource (e.g., and, in some cases, certain related resources) up to a "last sample time" 330k, which can be the most recent time at which a sample was collected relating to the resource of interest.

The "time" 310 associated with samples and/or with computing the time-based probability function 350 can be expressed in any suitable manner. In some embodiments, the time 310 can be expressed as a relative time with reference to the request time 340. For example, past data 325 can be expressed as an amount of time in the past relative to the request time 340 and/or future predicted probabilities can be expressed with reference to amounts of time from "t=0," or the like, where "t=0" is the request time. In other embodiments, the time 310 can be expressed with reference to an absolute time scale, such as a timestamp (e.g., date and time, rounded to the nearest second, or the like). The absolute time can be based on a location (e.g., time zone) of the hinting machine 130, a pre-negotiated time basis (e.g., Greenwich mean time, time measured from a defined epoch, etc.), etc.

In some implementations, one or more additional mathematical considerations can be included in computing the time-based probability function 350. As one example, some implementations can apply a decay function to the time-based probability function 350, so that the predicted future probability decreases in a particular manner (e.g., by a predetermined slope, decay rate, half-life, etc.) over time. In certain such implementations, the decay function can be applied to an instantaneous probability and/or any time of time-based probability computation (e.g., after a last data sample is collected, the probability for that resource can monotonically decrease according to the hint decay function). In some instances, application of the decay function does not require that the overall probability function is monotonically decreasing; rather the hint decay function can produce a contribution that effectively decreases the time-based probability function 350 over time. One example of a hint decay function is a square function that starts at one (e.g., 100%) and drops to zero (e.g., 0%) at a certain time, thereby representing an expiration time for a particular hint, or the like. As another example of additional mathematical considerations that can be included in computing the time-based probability function 350, some implementations can apply a weighting function to resource samples in the past data 325 to favor some samples over others. The weighting can be based on "freshness" (e.g., more recent samples can be weighted more favorably than older samples), on domain relationships (e.g., samples of the resource recorded in association with a requested domain can be weighted more heavily than samples recorded for the same resource in association with other domains), on platform relationships (e.g., samples of the resource recorded in association with platforms similar to a presently requesting platform can be weighted more heavily than samples recorded for other platforms), etc.

The time-based probability function 350 can be computed in any suitable manner and at any suitable time. For example, the time-based probability function 350 can be re-computed each time a new sample is collected for a resource, periodically, in response to a hinting request, etc. As described herein, the computed time-based probabilities can be used ultimately to develop time-dependent hints. Accordingly, in some instances, there is a "request time" 340 at which a particular domain, resource, etc. is requested, and the time-based probability function 350 is exploited. It can generally be assumed that the request time 340 follows the last sample time 330k, so that the time-based probability function 350 is useful for predicting a time-dependent rendering probability of a particular resource substantially at the request time 340 (i.e., an instantaneous probability) and/or at one or more future times (e.g., one or more instantaneous probabilities associated with particular future times, one or more average probabilities associated with one or more future timeframes, one or more probability functions associated with one or more future timeframes, etc.).

In some instances, rendering status of resources can be modeled according to one or more presence models. Each presence model can effectively be a score, a parametric function, a machine learning model, a statistical model, etc. Some embodiments can attempt to statistically fit resource rendering status data into one or more predetermined presence models. FIGS. 4A-4D show graphical plots 400 of sets of resource samples that can be fit into illustrative types of presence models. Each plot 400 shows samples of resource presence 420 for a particular resource at multiple sample times 330 (e.g., from some sample time 330a to some last sample time 330k). For the sake of simplicity, each presence 420 is plotted in a binary fashion (e.g., as "present" or "not present"), and a line is drawn through the sample points. The plots 400 are not intended to limit the types of data, amounts of data, etc. that can be collected, or the manner in which it can be expressed. For example, the sample times 330 may not be equally spaced, there may be more than two dimensions (e.g., the presence may account for other information, such as location, platform, etc., as described above), etc.

Figure 4A:
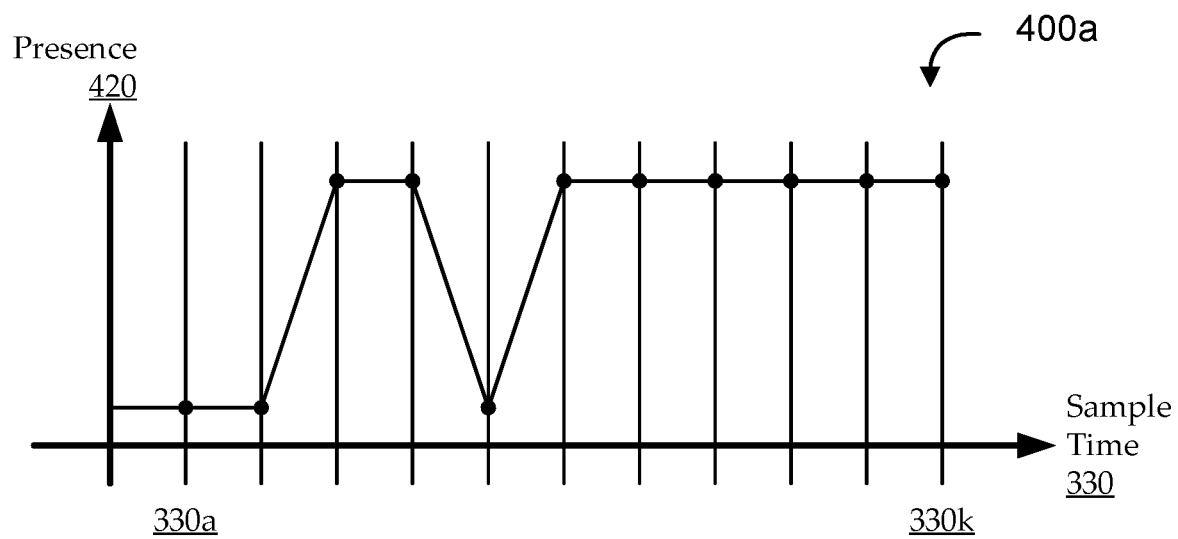
FIGS. 4A-4D show graphical plots of sets of resource samples that can be fit into illustrative types of presence models.

Turning to a first example, FIG. 4A shows resource samples following a "short-term regular presence" type of presence model. For example, the most recent N samples for this resource indicates presence, but some prior samples indicate absence. This can suggest that the resource is consistently rendered as part of a particular web page, but the consistency is only evident in the short term. Some implementations can compute a time-based probability function 350 from such data to reflect a high probability of this resource being rendered with this web page, though the computed function can also indicate a lower probability and/or a sharper decay in accordance with the short-term nature of the consistency. For example, as the data remains consistent for a longer amount of time, the computed time-based probability function 350 may indicate a higher probability and/or less decay over time. Further, the presence model can be implemented to consider occasional indications of absence in various manners. For example, one implementation can consider a resource as no longer "regular" when there is a single sample of absence. Another implementation can consider a resource as "regular" whenever there is a minimum threshold number of consecutive samples of presence. Another implementation can consider a resource as "regular" whenever there is fewer than a maximum threshold number (or frequency) of consecutive samples of absence.

Figure 4B:
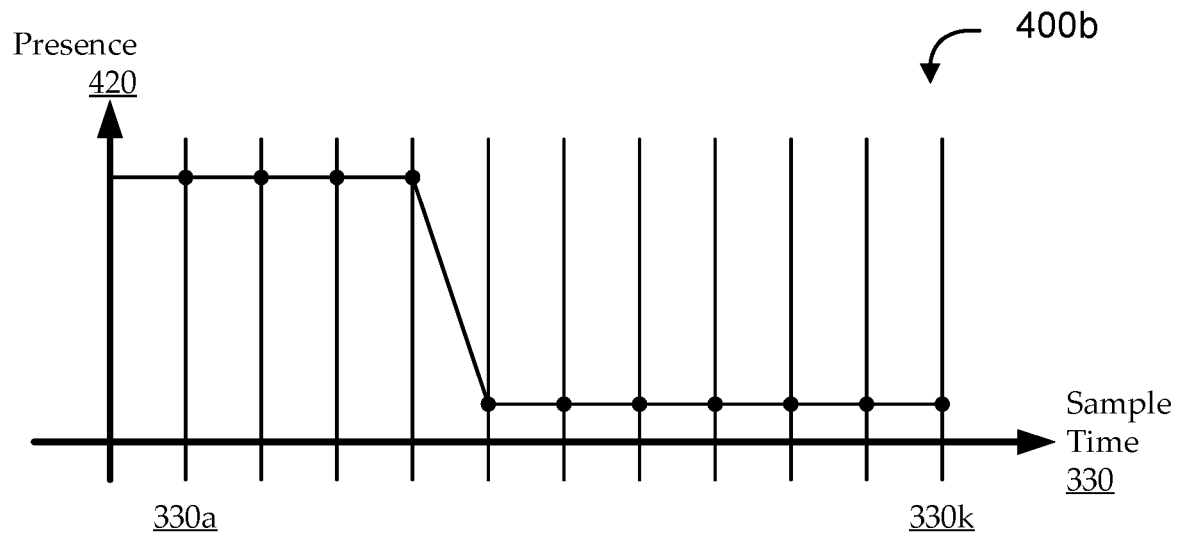

Turning to a second example, FIG. 4B shows resource samples following a "discarded" type of presence model. For example, the most recent N samples for this resource indicates absence, while prior samples indicate presence. This can suggest that the resource was previously rendered as part of a particular web page, but is apparently no longer part of the web page. Some implementations can compute a time-based probability function 350 from such data to reflect a low (or zero) probability of this resource being rendered with this web page. In certain implementations, the low probability can be further impacted (e.g., weighted) by the persistence (e.g., number of samples, freshness of the samples, etc.) of the absence indications. For example, as the absence data remains consistent for a longer amount of time, the computed time-based probability function 350 may indicate a lower probability.

Figure 4C:
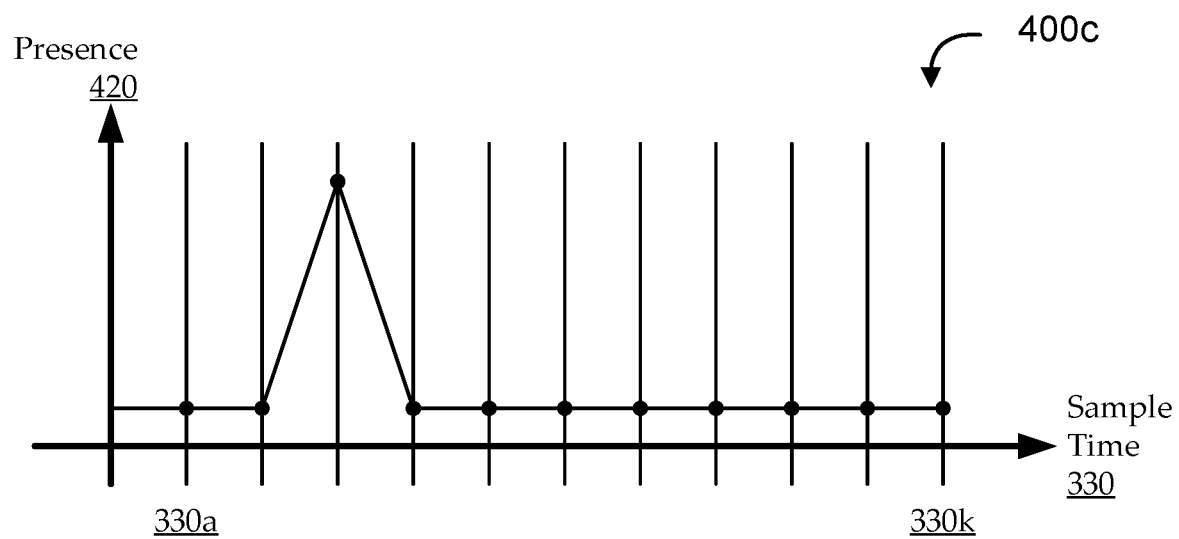

Turning to a third example, FIG. 4C shows resource samples following a "one-off" type of presence model. For example, the sample data shows a single (or limited number of) samples indicating presence amid a large number of samples (before and after) indicating absence. This can suggest that the resource was rendered once (or a limits number of times) as part of a particular web page, but is apparently not presently part of the web page. Some implementations can compute a time-based probability function 350 from such data to reflect a low (or zero) probability of this resource being rendered with this web page. In certain implementations, the low probability can be further impacted (e.g., weighted) by the persistence (e.g., number of samples, freshness of the samples, etc.) of subsequent presence and/or absence indications.

Figure 4D:
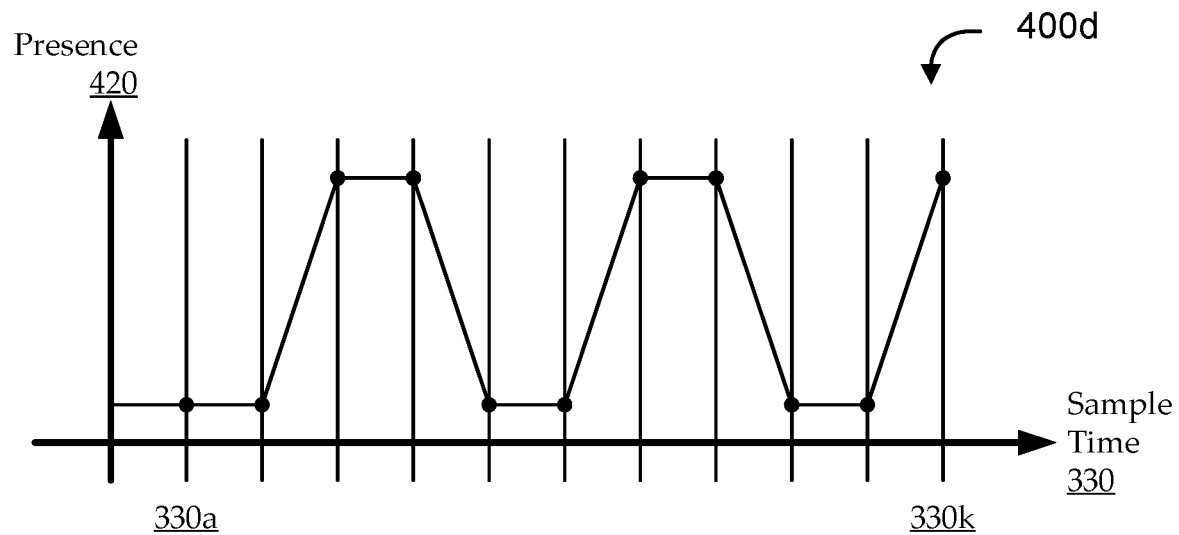

Turning to a fourth example, FIG. 4D shows resource samples following a "transitory" or "periodic" type of presence model. For example, the sample data shows a pattern of presence and absence over time. This can suggest that the resource tends to be rendered as part of a particular web page during certain times (e.g., certain times of day, month, year, etc.) and not otherwise, but in a manner that is deterministic to a level of statistical confidence. Some implementations can compute a time-based probability function 350 from such data to reflect a probability that substantially follows the deterministic pattern. For example, the computed time-based probability function 350 can follow a periodic function (e.g., a step or sinusoidal function, etc.), or the like. For the sake of illustration, such periodic probabilities can be present in a web page that is updated with new content at some deterministic period (e.g., every Wednesday morning at 5:00 am).

The examples provided in FIGS. 3-4D are intended only to illustrate certain types of persistence models and time-based probability functions 350, and are not intended to include all types or to limit implementations to any numbers or types of models or functions. Further, embodiments can tune the models and or time-based probability function 350 computations in any suitable manner. As one example, time-based probability functions 350 can be computed from the resource samples using a sliding window that defines a timeframe of relevance, and the size of the window can be adjusted based on certain factors, different for different types of models, etc. As another example, machine learning and/or similar techniques can be used to develop persistence models that may or may not follow regular patterns. For example, principle component analyses, or other types of data analysis, can be used to extract the persistence features having the most relevance and the manners in which they are relevant; and those extracted features can be used to formulate persistence models (e.g., dynamically, periodically, etc.).

Returning to FIG. 2A, embodiments of the TDH generator 260 can use the calculated time-based probabilities to generate time-dependent hints for prefetching the set of resources in association with rendering the web page by a client machine. For example, having computed predictions of presence probabilities for resources over time, those predictions can be exploited in determining which resources to prefetch (e.g., and/or in which priorities, orders, etc.) in response to a request for loading a web page. The time-dependent hints for a particular resource can be generated as a function of the respective time-based probability function(s) 350 (e.g., which may be expressed as a set of data points, a mathematical expression, and/or in any other suitable manner) associated with that resource and the request time. In some embodiments, the time-dependent nature of the hints can increase the likelihood that the most relevant resources will be fetched in the most optimal order, thereby improving page load times and/or otherwise improving performance of web transactions. In other embodiments, availability of predicted time-based probabilities (e.g., functions, data points, etc.) can be exploited to generate time-dependent hints even when further information is not available at the request time, for example, when hinting information is otherwise outdated, a client machine 110 is unable to access the hinting machine 130, etc.

Embodiments of the hinting machine 130 can include a communications subsystem 250 that can communicate the generated time-dependent hints to one or more client machines 110. In some embodiments, the communications subsystem 250 can also receive and handle hinting requests and/or other hinting related communications with client machines 110, content servers 120, etc. For example, the communications subsystem 250 can receive a hinting request from a client machine 110 over the communications network 140 at a request time in association with the client machine 110 rendering a web page. The TDH generator 260 can generate, in response to the hinting request, a hinting response that includes time-dependent hints generated from respective time-based probabilities (e.g., computed before and/or at the request time). The communications subsystem 250 can then communicate the hinting response to the client machine 110 in response to the hinting request.

In some embodiments, the TDH generator 260 can generate the time-dependent hints by calculating instantaneous hinting probabilities for one or more of the time-dependent hints as a function of the request time and of the respective time-based probability for the resources associated with those one or more time-dependent hints. For example, the instantaneous probability can be the computed probability at the request time as a function of a time-based probability function associated with the resource. The communications subsystem 250 can then communicate the hinting response by communicating the time-dependent hint along with its associated instantaneous probability.

In other embodiments, the TDH generator 260 can generate the time-dependent hints by calculating one or more hinting probability functions as a function of the respective time-based probabilities for one or more resources associated with one or more time-dependent hints. As described above (e.g., with reference to FIGS. 3-4D), the hinting probability functions can indicate probabilities of the resource being requested as part of rendering the web page by the requesting client machine at times subsequent to the request time. The communications subsystem 250 can then communicate the hinting response by communicating the time-dependent hint along with the one or more hinting probability functions. As illustrated, in some embodiments, further hinting information can be stored in the same or another hinting information store 135. The additional hinting information can include any information useful for performing static, time-dependent, and/or other hinting functionality.

Figure 5:
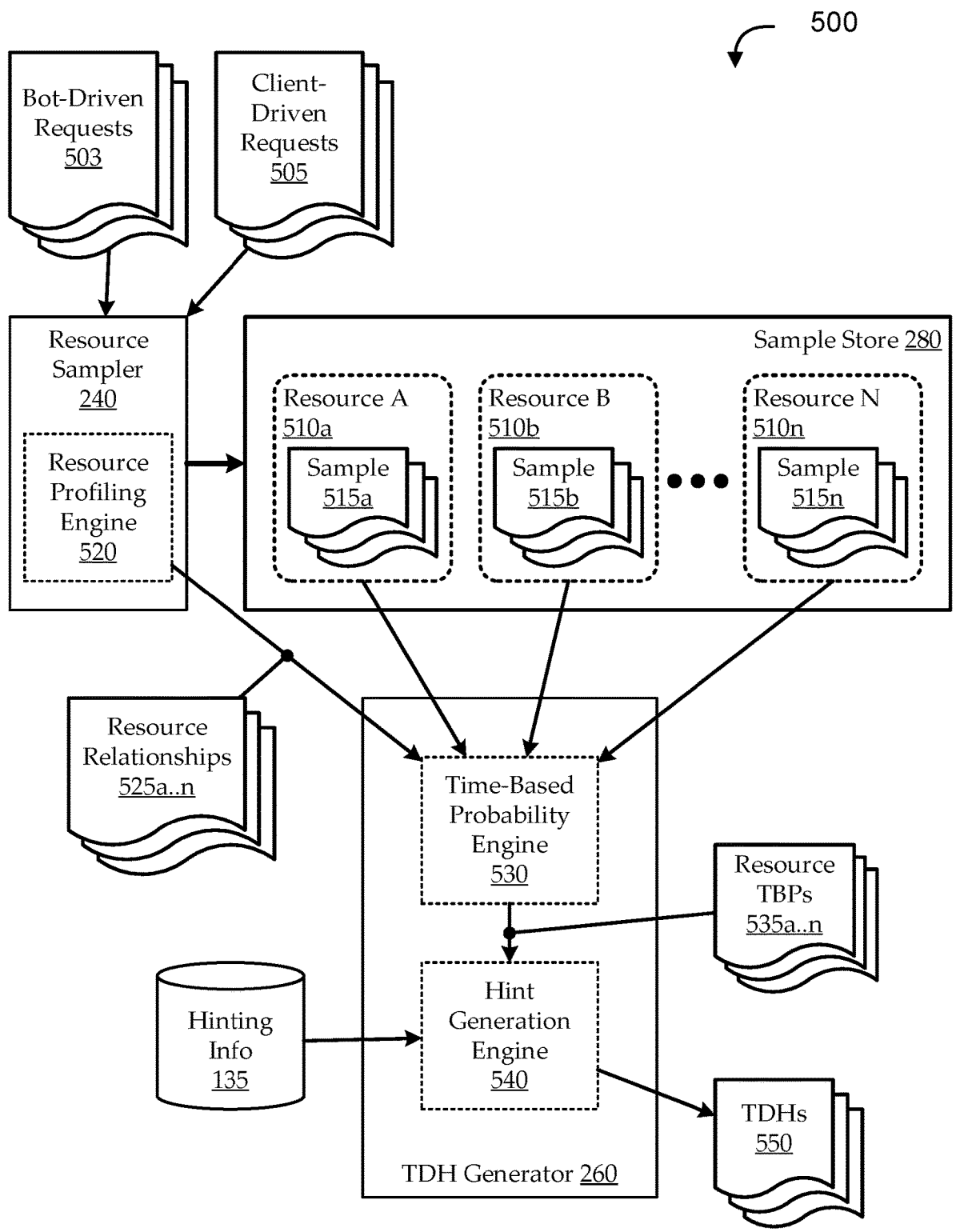
FIG. 5 shows an illustrative system for implementing a data flow, according to various embodiments.

For added clarity, FIG. 5 shows an illustrative system 500 for implementing a data flow, according to various embodiments. The system can include means for receiving a plurality of resource samples 515. As described herein, the means can include any suitable hardware (e.g., and supporting software) for communicating over a network and/or loading resources in performance of (or simulation of, etc.) a web transaction, such as antennas, physical and/or logical ports, protocols, modems, routers, etc. As illustrated, the means can include a resource sampler 240 and a resource sample store 280. The resource sampler 240 can collect samples 515 of resources in association with bot-driven requests 503 and/or client-driven requests 505 for web transactions (e.g., for loading of web pages). The collected samples 515 can be stored in a resource sample store 280 in any suitable manner. For example, the samples 515 can be grouped by associated resource 510, etc. The sample data store 280 can include any suitable tangible storage hardware and supporting hardware and/or software.

Some embodiments of the resource sampler 240 can also include a resource profiling engine 520 for generating, fitting, and/or otherwise determining and exploiting resource relationships 525. For example, as described above, the resource relationships can include locations of resources on pages, groups of resources associated with a same page, resources of a particular file type, etc. In some embodiments, the time-based probabilities and/or time-dependent hints for a particular resource can be determined as a function of the time-based probabilities and/or time-dependent hints for one or more other related resources. Some embodiments of the resource profiling engine 520 can also generate and/or fit presence models and/or other types of profiles.

The system 500 further includes means for calculating, as a function of the resource samples 510, a time-based probability 535 of each resource 510 being fetched over time as part of rendering the web page. For example, the resource samples 515 and/or the resource relationships 525 can be provided to the means for calculating, which can include a TDH generator 260 for generation of time-dependent hints 550. For example, the means for calculating can be implemented as a time-based probability engine 530 that is part of the TDH generator 260. The time-based probability engine 530 can include hardware, such as hardware computational platforms and associated software, for receiving the resource samples 515 and/or the resource relationships 525 and calculating time-based probabilities 535 for the sampled resources 510, accordingly. The TDH generator 260 can further include means for generating, according to the respective time-based probabilities 535, time-dependent hints 550 for prefetching the set of resources 510 in association with rendering the web page by a client machine (e.g., client machines 110). For example, the means for generating the time-dependent hints 550 can include computational hardware and associated software for receiving the computed time-based probabilities 535 (e.g., and additional hinting information 135), and formulating the time-dependent hints 550 according to one or more data formats, protocols, etc.

In some implementations, the client machines 110 can store the received time-based probabilities for use in client machine-driven hint generation. For example, in instances where the client machine 110 determines that it is preferable to self-generate hints (e.g., where it is determined that there is no connection with a hinting machine 130, where the connection with the hinting machine 130 is determined to be slow or unreliable, etc.), the client machine 110 can use the stored time-based probability function to generate its own hints for the associated resource in a manner that accounts for time dependence in context of the request time. Embodiments of the client machines 110 can receive the time-dependent hints from the hinting machine(s) 130 over the communications network 140. The client hinting subsystem 230 (e.g., which can include a page fetcher and/or any other suitable components) can prefetch at least some of the resources in association with loading the web page and in accordance with the received time-dependent hints. In some implementations, the client hinting subsystem 230 includes a hint store that can store the received time-dependent hints with their associated hinting probabilities (e.g., associated time-based probability functions) as calculated by the hinting machine(s) 130. In such implementations, the client hinting subsystem 130 (e.g., the page fetcher) can prefetch some or all of the resources by computing a set of client-side hints for those associated resources as a function of the request time and the stored hinting probability functions, and prefetching the associated resources according to the set of client-side hints.

Figure 2B:
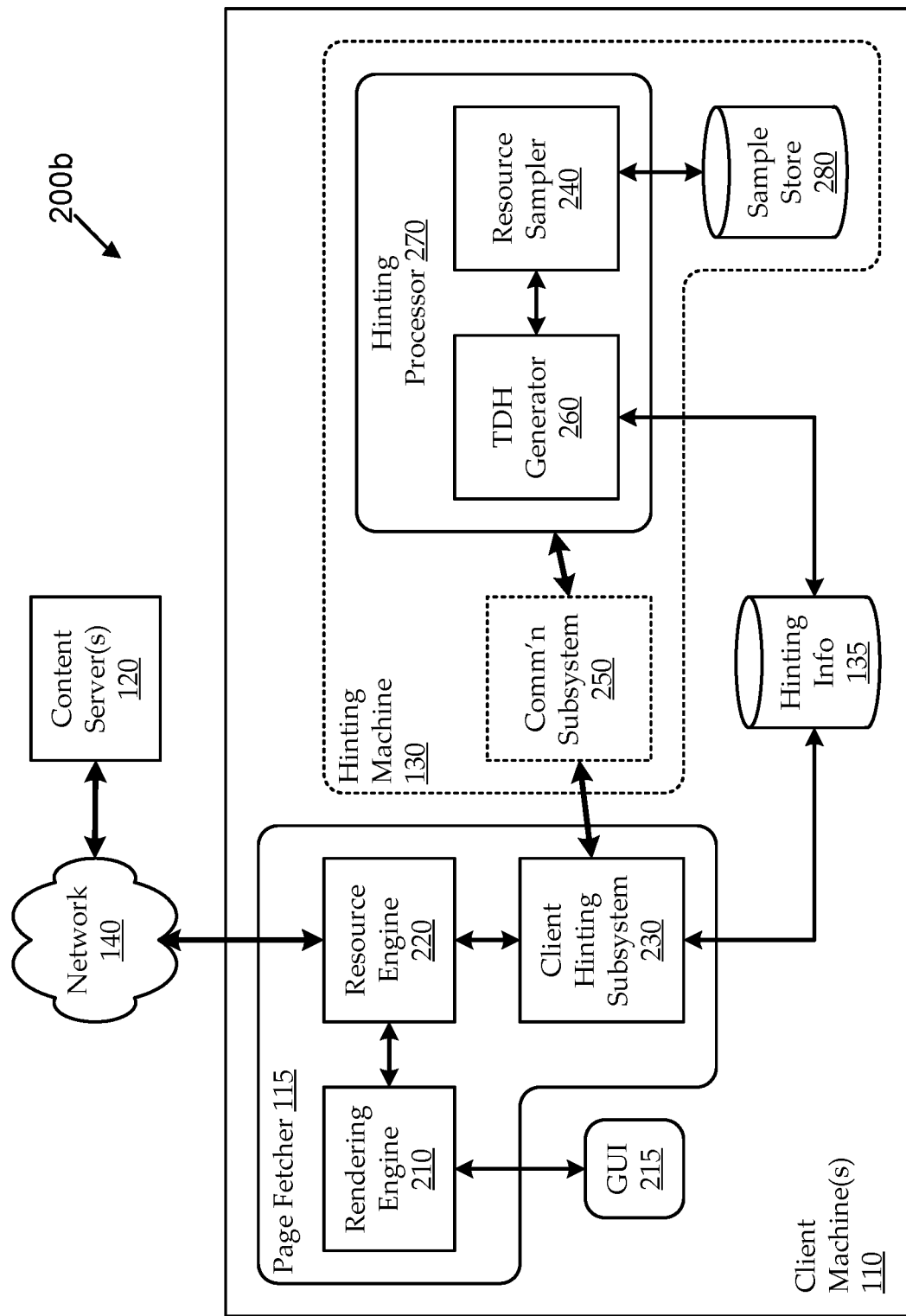
FIG. 2B shows a block diagram of a portion of another illustrative communications environment for implementing time-dependent hint generation, according to various embodiments.

FIG. 2B shows a block diagram of a portion of another illustrative communications environment 200b for implementing time-dependent hint generation, according to various embodiments. Embodiments of the communications environment 200a can be implemented in a manner that is substantially similar or identical to that of the communications environment 200a described with reference to FIG. 2A, except that the server machine 130 is implemented as part of the client machine 110 in FIG. 2B. Accordingly, similar components are identified by the same reference designators in FIGS. 2A and 2B for added clarity. Such designation is intended to indicate similarity of function and not to limit possible implementations for those components.

For example, the resource sampler 240 and the TDH generator 260 can be implemented as part of a hinting processor 270. The hinting processor can include any hardware and/or software for implementing time-dependent hinting, as described with respect to the resource sampler 240 and the TDH generator 260. Embodiments of client machines 110 having integrated hinting machines 130 can be used to provide various features. One such feature is provision of peer-to-peer hinting services. For example, the hinting machines 130 integrated in client computers 110 can be used for peer-to-peer aggregation of hints across some or all peers, for distributed machine-driven hint generation, etc. Another such feature is generation of hints by a client based on its own hinting information. For example, the client machine 110 can maintain its own hinting feedback and/or collect hinting feedback from other client machines 110

(e.g., periodically by some synchronization process, using a dictionary or client model, etc.), and the client machine 110 can generate its own hints, as needed, without consulting any other client machines 110 or hinting machines 130).

Figure 6:
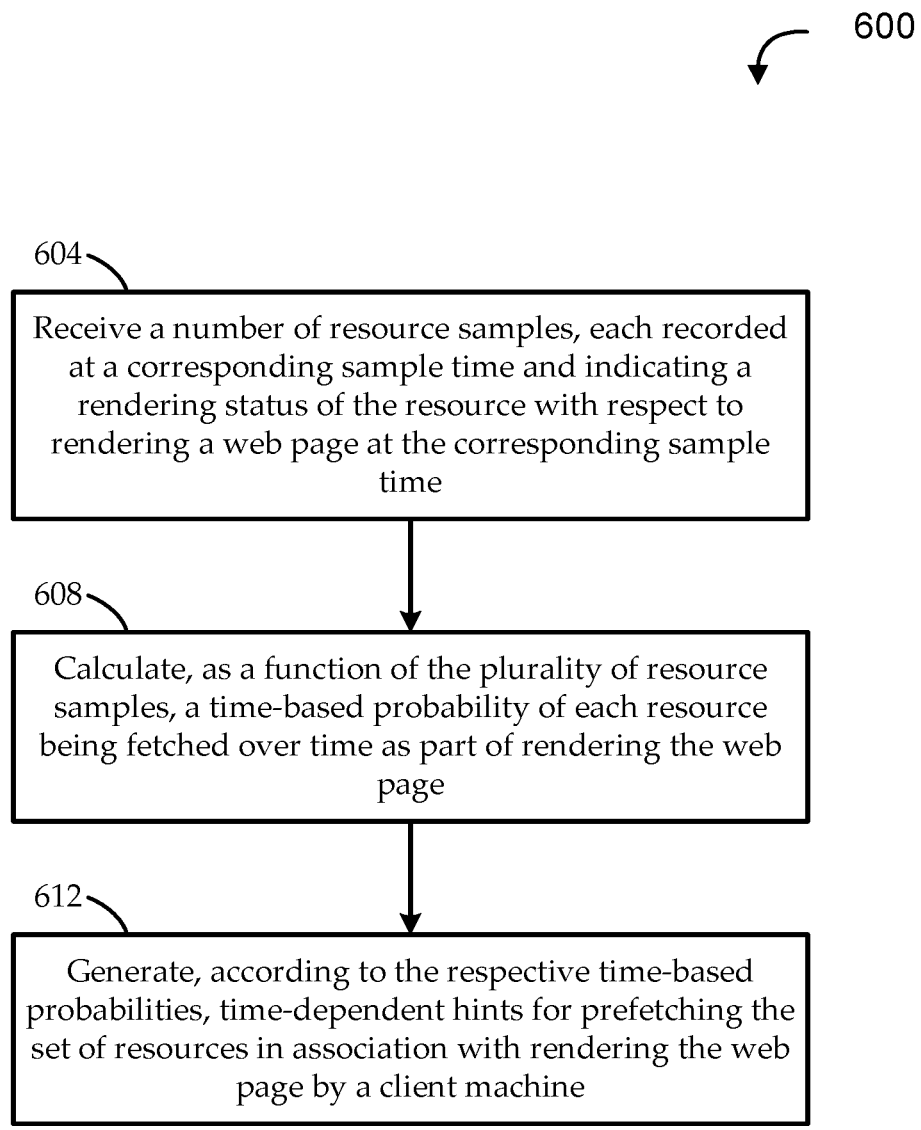
FIG. 6 shows a flow diagram of an illustrative method for time-dependent machine-generation of hints, according to various embodiments.

FIG. 6 shows a flow diagram of an illustrative method 600 for time-dependent machine-generation of hints, according to various embodiments. Embodiments of the method 600 can be implemented by any suitable system, such as the systems described with reference to FIGS. 1-3. The method 600 can begin at stage 604 by receiving resource samples (e.g., by a hinting machine). Each resource sample can be recorded at a corresponding sample time and can indicate a rendering status of the resource with respect to rendering a web page at the corresponding sample time. At stage 608, embodiments can calculate, as a function of the resource samples, a time-based probability of each resource being fetched over time as part of rendering the web page. At stage 612, embodiments can generate, according to the respective time-based probabilities, time-dependent hints for prefetching the set of resources in association with rendering the web page by a client machine.

Figure 7:
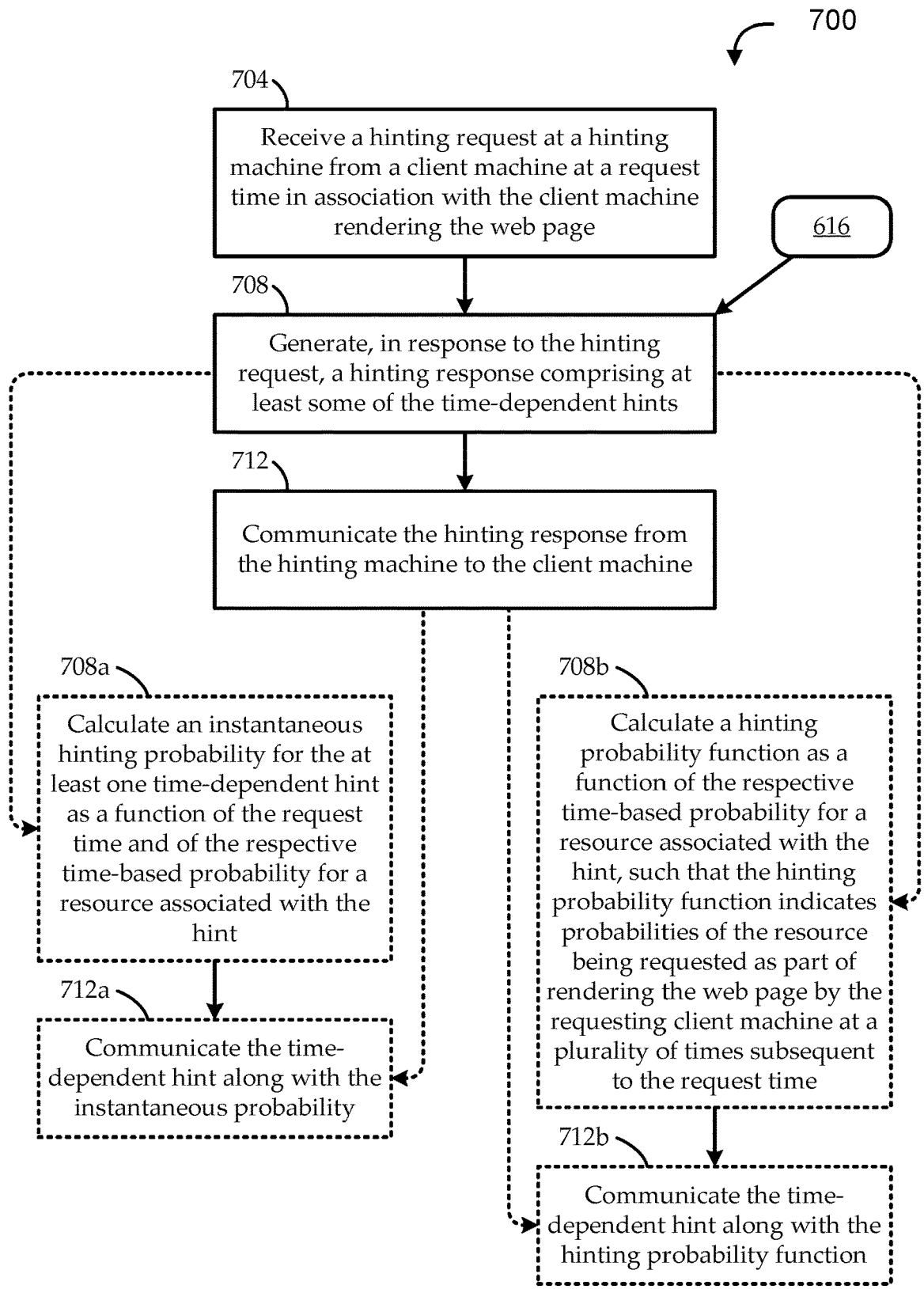
FIG. 7 shows a flow diagram of another method for time-dependent hinting, according to various embodiments.

FIG. 7 shows a flow diagram of another method 700 for time-dependent hinting, according to various embodiments. Embodiments of the method 700 can begin at stage 704 by receiving a hinting request (e.g., at a hinting machine from a client machine) at a request time in association with the client machine rendering the web page. At stage 708, embodiments can generate, in response to the hinting request, a hinting response that includes time-dependent hints (e.g., at least some of the time-dependent hints generated in stage 616 of FIG. 6). At stage 612, embodiments can communicate the hinting response (e.g., from the hinting machine) to the client machine in response to the request. According to some embodiments of the method 700, the generating at stage 708 can include calculating an instantaneous hinting probability for one or more of the time-dependent hints as a function of the request time and of the respective time-based probability for resources associated with the one or more hints (illustrated as 708a). In such embodiments, the communicating at stage 712 can include communicating the time-dependent hint along with the instantaneous probability (illustrated as 712a). According to other embodiments, the generating at stage 708 can include calculating a hinting probability function as a function of the respective time-based probability for resources associated with one or more hint, such that the hinting probability function indicates probabilities of the resource being requested as part of rendering the web page by the requesting client machine at multiple times subsequent to the request time (illustrated as 708b). In such embodiments, the communicating at stage 712 can include communicating the time-dependent hint along with the hinting probability function (illustrated as 712b).

Figure 8:
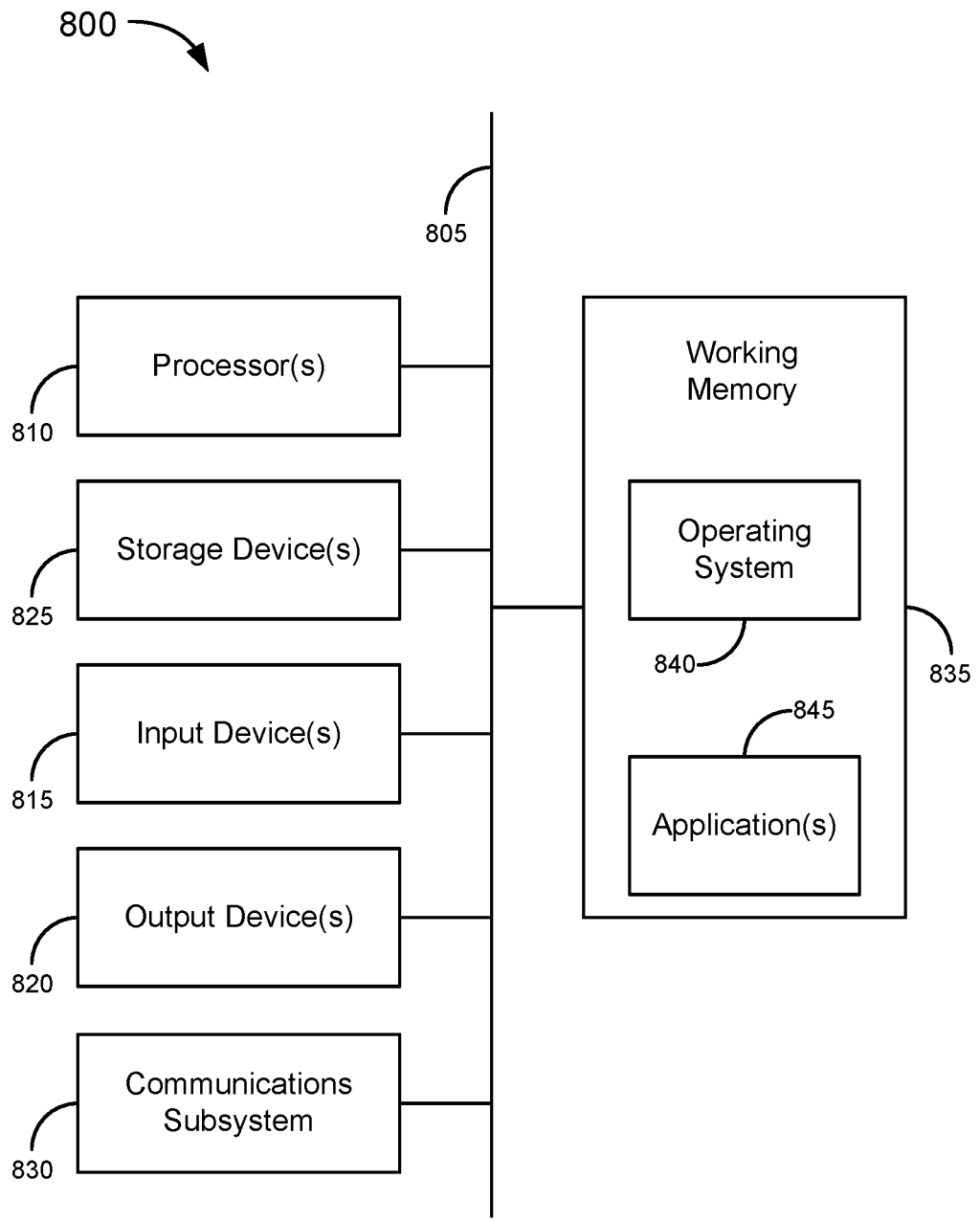
FIG. 8 provides a schematic illustration of one embodiment of a computer system that can perform the methods of the invention, as described herein, and/or can function, for example, as any part of client machine(s), content server(s), hinting machine(s) 130 or any other such computer or device.

FIG. 8 provides a schematic illustration of one embodiment of a computer system 800 that can perform the methods of the invention, as described herein, and/or can function, for example, as any part of client machine(s) 110, content server(s) 120, hinting machine(s) 130, or any other such computer or device. It should be noted that FIG. 8 is meant only to provide a generalized illustration of various components, any or all of which may be utilized, as appropriate. FIG. 8 therefore broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard, touchscreen, and/or the like; and one or more output devices 820, which can include, without limitation, a display device, a printer, and/or the like.

The computer system 800 may further include (and/or be in communication with) one or more storage devices 825, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 800 might also include a communications subsystem 830, which can include, without limitation, a modem, a network card (wireless or wired), an infrared communication device, a wireless communication device, and/or chipset (such as an 802.11 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 and/or other code, such as one or more applications 845, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 800, and/or might take the form of source and/or installable code which, upon compilation and/or installation on the computer system 800 (e.g., using any of a variety of generally available compilers, installation programs, compression/decompression utilities, etc.), then takes the form of executable code. In certain embodiments, this may include page fetcher functionality and may include separate page fetcher modules as part of this page fetcher functionality executed by a process to enable display of a web page on an output device 820 of such a computer system 800.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor 810 executing one or more sequences of one or more instructions (which might be incorporated into the operating system 840 and/or other code, such as an application 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 800, various machine-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms including, but not limited to, non-volatile media. Non-volatile media includes, for example, optical or magnetic disks, such as the storage device(s) 825. Common forms of physical and/or tangible computer-readable media include, for example, a flexible disk, hard disk, magnetic tape or any other magnetic medium, a CD-ROM or any other optical medium, solid-state circuit based memory or any other memory chip or cartridge, or any other medium from which a computer can read instructions and/or code. Various forms of machine-readable media may be involved in carrying one or more sequences of one or more instructions to the processor(s) 810 for execution. Merely by way of example, the instructions may initially be carried on a memory of a remote computer. A remote computer might load the instructions into its dynamic memory and send the instructions as signals over a transmission medium to be received and/or executed by the computer system 800.

The communications subsystem 830 (and/or components thereof) generally will receive the signals, and the bus 805 might then carry the signals (and/or the data, instructions, etc., carried by the signals) to the working memory 835, from which the processor(s) 810 retrieves and executes the instructions. The instructions received by the working memory 835 may optionally be stored on a storage device 825 either before or after execution by the processor(s) 810.

Figure 9:
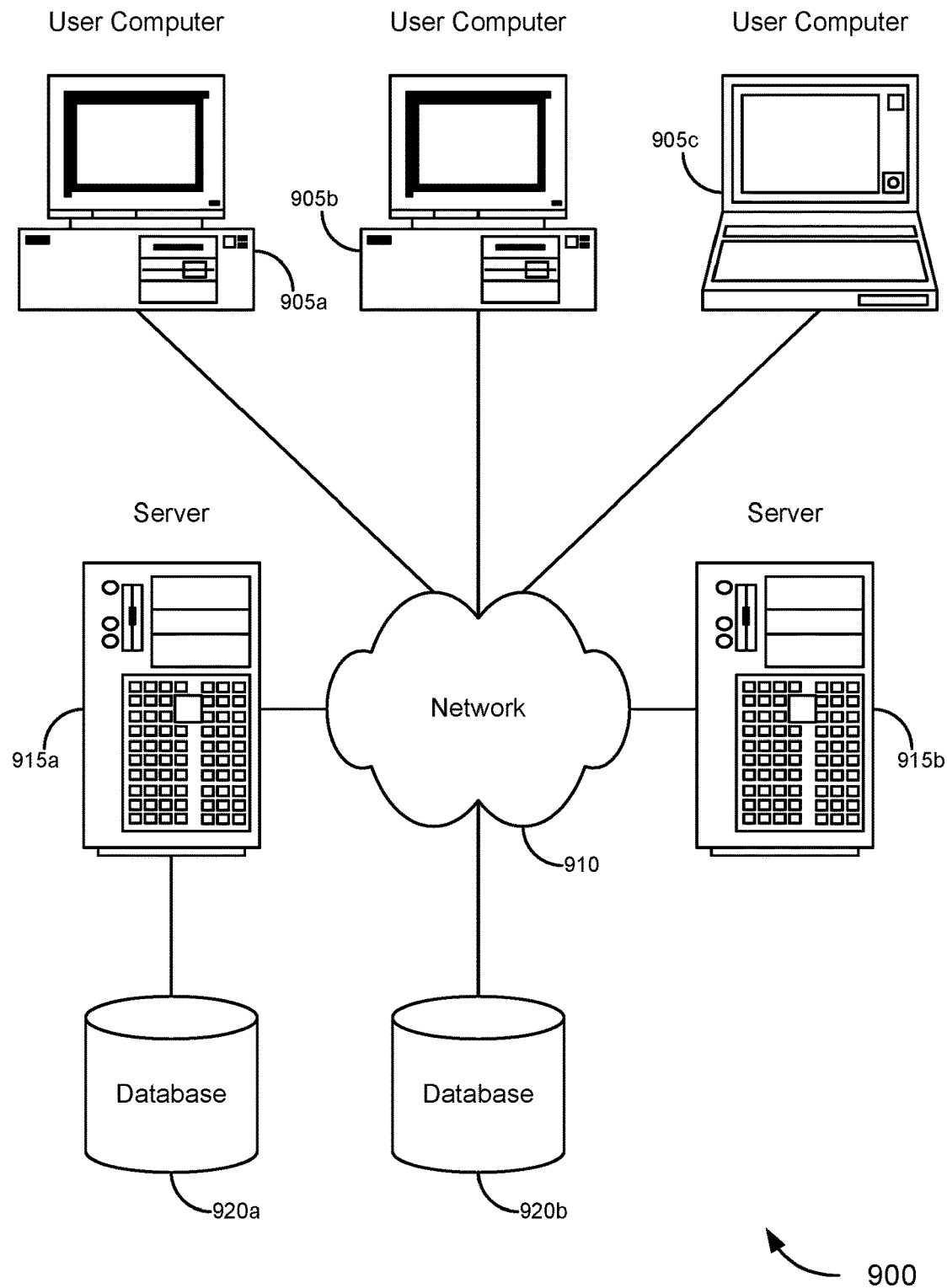
FIG. 9 illustrates a schematic diagram of a network system that can be used in accordance with one set of embodiments.

A set of embodiments includes systems for implementing time-dependent hinting. FIG. 9 illustrates a schematic diagram of a network system 900 that can be used in accordance with one set of embodiments. In such embodiments, the network system 900 may represent any number of client and server devices that enable content to be communicated from content providers to user systems as part of web page transactions across a network. The system 900 can include one or more user computers 905, such as computers for implementing client machine(s) 110 of FIG. 1. The user computers 905 can be general-purpose personal computers and/or can have any of a variety of applications, including one or more applications configured to perform methods of the invention, as well as one or more office applications, database client and/or server applications, and page fetcher applications. Alternatively, the user computers 905 can be any other electronic device, such as a thin-client machine, Internet-enabled mobile telephone, tablet computer, phablet, wearable device, Internet-enabled appliance, and/or personal digital assistant (PDA) capable of communicating via a network (e.g., the network 910 described below) and/or displaying and navigating web pages or other types of electronic documents. Although the exemplary system 900 is shown with three user computers 905a-c, any number of user computers can be supported.

Certain embodiments of the invention operate in a networked environment, which can include a network 910, such as for implementing the network 140 of FIG. 1. The network 910 can be any type of network familiar to those skilled in the art that can support data communications using any of a variety of commercially-available protocols, including, without limitation, TCP/IP, UDP/IP, SNA, IPX, and the like. Merely by way of example, the network 910 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, or any other wireless protocol; and/or any combination of these and/or other networks.

Embodiments of the invention can include one or more servers 915 (or similar types of computational systems). Embodiments of the servers 915 can be used to implement the content server(s) 120 and/or the hinting machine(s) 130. As described above, the hinting machine(s) 130 can also be part of one or more content servers 120 and/or part of one or more client machines 110, which can be implemented as one or more of the servers 915. Each of the servers 915 may be configured with an operating system, including, without limitation, any of those discussed above, as well as any commercially (or freely) available server operating systems. Each of the servers 915 may also be running one or more applications, which can be configured to provide services to one or more user computers 905 and/or other servers 915.

Merely by way of example, one of the servers 915 may be a web server, which can be used, merely by way of example, to process requests for web pages or other electronic documents from user computers 905. The web server can also run a variety of server applications, including HTTP servers, FTP servers, CGI servers, database servers, script servers, and the like. In some embodiments of the invention, the web server may be configured to serve web pages that can be operated within a page fetcher on one or more of the user computers 905 to perform methods of the invention. In certain embodiments, the servers 915 may also include CDN devices which provide similar or identical content from an alternate server than the primary content server which is a source for particular objects in a web page transaction.

The servers 915, in some embodiments, might include one or more application servers, which can include one or more applications accessible by a client running on one or more of the user computers 905 and/or other servers 915. Merely by way of example, the server(s) 915 can be one or more general-purpose computers capable of executing programs or scripts in response to the user computers 905 and/or other servers 915, including, without limitation, web applications (which might, in some cases, be configured to perform methods of the invention). Merely by way of example, a web application can be implemented as one or more scripts or programs written in any suitable programming language. The application server(s) can also include database servers which can process requests from clients (including, depending on the configurator, database clients, API clients, page fetchers, etc.) running on a user computer 905 and/or another server 915. In some embodiments, an application server can create web pages dynamically for displaying the information in accordance with embodiments of the invention, such as information displayed as part of various page fetchers discussed herein. Data provided by an application server may be formatted as web pages (e.g., comprising HTML, scripts, etc.) and/or may be forwarded to a user computer 905 via a content server 120. Similarly, a content server 120 can receive web page requests and/or input data from a user computer 905 and/or forward the web page requests and/or input data to an application server. In some cases, a content server 120 may be integrated with an application server.

In accordance with further embodiments, one or more servers 915 can function as a file server and/or can include one or more of the files (e.g., application code, data files, etc.) necessary to implement methods of the invention incorporated by an application running on a user computer 905 and/or another server 915. Alternatively, as those skilled in the art will appreciate, a file server can include all necessary files, allowing such an application to be invoked remotely by a user computer 905 and/or server 915. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920, such as for implementing a resource sample data store 280, a hinting information data store 135, and/or any other suitable data store used by systems and methods of various embodiments. Such databases may include stores of web transaction history and hints derived from this web transaction history. Any supporting details related to creation of such hints may additionally be stored in such a database. The location of the database(s) 920 is discretionary: merely by way of example, a database 920a might reside on a storage medium local to (and/or resident in) a server 915a (and/or a user computer 905). Alternatively, a database 920b can be remote from any or all of the computers 905 or servers 915a,b, so long as the database 920b can be in communication with one or more of these (e.g., via the network 910). In a particular set of embodiments, a database 920 can reside in a storage-area network ("SAN") familiar to those skilled in the art. Likewise, any necessary files for performing the functions attributed to the computers 905 or servers 915 can be stored locally on the respective computer and/or remotely, as appropriate. In one set of embodiments, the database 920 can be a relational database that is adapted to store, update, and retrieve data in response to SQL-formatted commands. The database might be controlled and/or maintained by a database server, as described above, for example.

In any embodiment described herein, any communication, hypertext transport protocol (HTTP) request or response, web page transaction, portion of a web page transaction, or any combination of any communications in whole or in part that may use HTTP may also be implemented using hypertext transport protocol secure (HTTPS). The use of HTTPS involves encryption and various security measures, and any embodiment described herein may be adapted to implement systems and methods described herein to accommodate the encryption and security associated with HTTPS in a number of ways.

In certain embodiments, proxy devices involved in any communication described herein may be provided with details associated with HTTPS communications in order to enable any proxy device functionality described herein. Such details may be provided by a user device with user consent to enable proxy device or hinting machine device interaction with the user's communications. This may enable decryption of HTTPS communication by the proxy to enable any functionality described herein. Such details to enable decryption may also be provided by a content server or content server operator to enable proxy device interaction with the content provider's communications. For aspects of embodiments described herein relating to client-side functionality or page fetcher functionality, certain embodiments may function with the same implementation described above for proxy devices. This functionality may be used as well with any other server side or content device.

In other embodiments, rather than a proxy decryption of HTTPS communications, a browser on a user device may interact with a proxy device or a hinting machine device, independent of the original HTTPS communication to provide details of the HTTPS communication to the proxy device or hinting machine device. In a user device page fetcher, this may involve the use of a page fetcher module, page fetcher plug-in, or page fetcher with specialized core functionality to observe HTTPS communications before they are encrypted. If needed, the independent communications with the proxy device or hinting machine device may then additionally be subject to security similar to the security used for the original HTTPS communication. For embodiments described herein which may involve integration with content provider systems or reverse proxy systems, HTTPS communication received at the content provider system or reverse proxy may be used as part of the embodiments described herein after the HTTPS communication is decrypted by the content provider system or reverse proxy. Thus, any "observing" or "identifying" functionality described herein may be performed with HTTPS communications for client machines, proxy devices, and content provider devices. Similarly, any embodiment described herein may be implemented with other secure connection and communication systems or protocols in addition to HTTPS described above.

Certain embodiments described herein refer to proxy devices or proxy systems. As described herein, proxy devices may be one or more devices operating as part of a system to intercept communications between user devices and content devices. Such proxies may be transparent to the user and content devices, or may be part of a multi-step communication path which is apparent to user and content devices. In certain embodiments, proxy devices may function as part of a forward proxy system, where communications from a group of user devices are all communicated to a broader network (such as the Internet) via the forward proxy system. In alternate embodiments, the proxy devices may function as part of reverse proxy systems, where a reverse proxy system operates as an access path to a number of content server devices. It will be apparent that embodiments described herein as including a proxy will apply to both forward proxy systems and reverse proxy systems, and any configuration of a system including a proxy, given appropriate accommodations for the particular system structure.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The terms "one" or "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Similarly, terms, such as "optimize" are not intended to limit embodiments to an optimal approach or result, but rather to express seeking movement toward an optimal result (e.g., to improve, etc.). As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for hint generation, the method comprising:
receiving, by a hinting machine from one or more client machines, feedback information generated based on prior renderings of a web page by the one or more client machines, wherein:
prior renderings of the web page comprise obtaining a root object and one or more child resources for the web page,
the feedback information comprising a plurality of resource samples of one or more of the one or more child resources,
each resource sample comprising a sample time corresponding to one of the one or more child resources and indicating a rendering status of the respective child resource during the corresponding prior rendering of the web page at the respective sample time, the rendering status indicating whether the respective child resource was loaded at the corresponding sample time or not;
determining resource relationships between the plurality of resource samples, the resource relationships indicating a correspondence of a rendering status of a first resource sample with a rendering status of a second resource sample;
determining, by the hinting machine as a function of the plurality of resource samples, a time-based probability function that generates a probability that an individual child resource of the one or more child resources will be requested and that a second child resource will be requested based on the determined resource relationship with the individual child resource in the course of rendering the web page, the time-based probability function determined by applying a weighting function to each resource sample of the plurality of resource samples to weight an impact of each resource sample on the probability generated by the time-based probability function for the individual child resource;
calculating, by the hinting machine, one or more probabilities using the time-based probability function, each probability corresponding to one of the one or more child resources and indicating a probability that the corresponding one of the one or more child resources will be requested from a content server in the course of rendering the web page at a particular time in the future; and
generating, by the hinting machine according to the probability, a hint for prefetching one or more of the one or more child resources as a part of a future rendering of the web page by a requesting client machine.

2. The method of claim 1, further comprising:
receiving a hinting request at the hinting machine from the requesting client machine at a request time in association with the requesting client machine rendering the web page;
generating, by the hinting machine in response to the hinting request, a hinting response comprising the hint; and
communicating the hinting response from the hinting machine to the requesting client machine.

3. The method of claim 2, wherein:
generating the hint comprises using the time-based probability function to calculate an instantaneous hinting probability for the hint at the request time or at a specified time subsequent to the request time and the corresponding probability for the child resource; and
communicating the hinting response comprises communicating the hint along with the instantaneous hinting probability.

4. The method of claim 2, wherein:
communicating the hinting response comprises communicating the hint along with the time-based probability function.

5. The method of claim 2, wherein:
the hinting request indicates a root uniform resource locator (URL) of the web page; and
the child resource is a child URL of the web page.

6. The method of claim 2, wherein the one or more probabilities are calculated prior to receiving the hinting request.

7. The method of claim 1 further comprising applying a hinting decay model to the one or more probabilities calculated using the time-based probability function.

8. The method of claim 1, wherein calculating the one or more probabilities comprises categorizing each resource sample according to a presence model.

9. The method of claim 1, wherein at least some of the resource samples are received by the hinting machine over a communications network from the one or more client machines after the respective client machine renders the web page.

10. The method of claim 1, wherein at least some of the resource samples are received by the hinting machine as part of automated web page crawling.

11. The method of claim 1, wherein the hinting machine is co-resident with the requesting client machine.

12. The method of claim 1, wherein calculating the one or more probabilities as a function of the plurality of resource samples comprises:
determining a freshness of each resource sample; and
weighting an impact of each resource sample on the corresponding probability according to the freshness of the resource sample.

13. The method claim 1, wherein the time-based probability function comprises a function that yields a probability that the corresponding child resource will be used as part of a future rendering of the web page as a function of a time associated with the future rendering of the web page.

14. The method of claim 1, further comprising:
generating a model for the web page based on the feedback information, the model indicating one or more probabilities for one or more of the one or more child resources, the one or more probabilities indicating whether the respective child resource will be used to render the web page at a time in the future, and
wherein generating the probability is based on the model.

15. A system for hint generation comprising:
a hinting machine disposed in a communications network, the hinting machine comprising:
a sample data store;
a resource sampler that operates to receive, from one or more client machines, feedback information generated based on prior renderings of a web page by the one or more client machines, wherein rendering the web page comprises obtaining a root object and one or more child resources, the feedback information comprising a plurality of resource samples of one or more of the one or more child resources for the web page, each resource sample comprising a sample time corresponding to one of the one or more child resources and indicating a rendering status of the respective child resource during the corresponding prior rendering of the web page at the respective sample time, the rendering status indicating whether the respective child resource was loaded at the corresponding sample time or not;

a hint generator that operates to:

determine resource relationships between the plurality of resource samples, the resource relationships indicating a correspondence of a rendering status of a first resource sample with a rendering status of a second resource sample;

determine, as a function of the plurality of resource samples, a time-based probability function that generates a probability that an individual child resource of the one or more child resources will be requested and that a second child resource will be requested based on the determined resource relationship with the individual child resource in the course of rendering the web page, the time-based probability function determined by applying a weighting function to each resource sample of the plurality of resource samples to weight an impact of each resource sample on the probability generated by the time-based probability function for the individual child resource;

calculate one or more probabilities using the time-based probability function, each probability corresponding to one of the one or more child resources and indicating a probability that the corresponding one of the one or more child resources will be requested from a content server in the course of rendering the web page at a particular time in the future; and generate, according to the probability, a hint for prefetching one or more of the one or more child resources as a part of a future rendering of the web page by a requesting client machine; and a communications subsystem that operates to communicate the hint to the requesting client machine.

16. The system of claim 15, wherein:

the communications subsystem further operates to receive a hinting request from the requesting client machine over the communications network at a request time in association with the requesting client machine rendering the web page;

the hint generator further operates to generate, in response to the hinting request, a hinting response comprising the hint; and the communications subsystem further operates to communicate the hinting response to the requesting client machine.

17. The system of claim 16, wherein:

the hint generator operates to calculate the one or more probabilities for the hint by using the time-based probability function to calculate an instantaneous hinting probability for the hint at the request time or at a specified time subsequent to the request time and the probability for the corresponding child resource; and the communications subsystem operates to communicate the hinting response by communicating the hint along with the instantaneous hinting probability.

18. The system of claim 16, wherein:

the communications subsystem operates to communicate the hinting response by communicating the hint along with the time-based probability function.

19. The system of claim 18, further comprising:

a first client machine, in communication with the hinting machine over the communications network, the first client machine comprising:

a client hinting subsystem that operates to receive the hint from the hinting machine over the communications network; and a page fetcher that operates to prefetch the child resource in association with rendering the web page and in accordance with the received hint.

20. The system of claim 19, wherein the first client machine further comprises:

a hint store that operates to store the received hint with the hinting probability function; and wherein the page fetcher operates to prefetch by computing a client-side hint for prefetching the child resource as a function of the request time and the stored hinting probability function, and prefetching the associated child resource according to the client-side hint.

21. The system of claim 20, wherein:

the page fetcher further operates to determine whether updated hints are available from the hinting machine at the request time; and the page fetcher operates to compute the client-side hint in response to the determining.

22. The system of claim 15, wherein the hint generator further operates to apply a hinting decay model to adjust the one or more probabilities calculated using the time-based probability function.

23. The system of claim 15, further comprising:

a first client machine comprising:

the hinting machine;

a client hinting subsystem that operates to receive the hint from the hinting machine; and a page fetcher that operates to prefetch the child resource in association with rendering the web page and in accordance with the received hint.

24. The system of claim 15, wherein the resource sampler further operates to receive:

one of the resource samples from a first client machine in association with a prior rendering of the web page by the first client machine, and another of the resource samples from a second client machine in association with a prior rendering of the web page by the second client machine; and wherein the second client machine is different than the first client machine.

25. The system of claim 15, wherein the time-based probability function comprises a function that yields a probability the corresponding child resource will be used as part of a future rendering of the web page as a function of a time associated with the future rendering of the web page.

26. A method for hint generation, the method comprising:

receiving, at a client machine from a hinting machine over a communications network, a plurality of hints for prefetching one or more child resources in association with loading a web page, the hints generated by the hinting machine by using a time-based probability function, determined as a function of a plurality of resource samples, that generates a probability that an individual child resource of the one or more child resources will be requested and that a second child resource will be requested based on a determined resource relationship with the individual child resource in the course of rendering the web page and by calculating one or more probabilities using the time-based probability function, each probability corresponding to one of the one or more child resources and indicating a probability that the corresponding one of the one or more child resources will be requested from a content server in the course of rendering the web page at a particular time in the future, each resource sample received by the hinting machine with respect to a corresponding sample time and indicating a rendering status of a corresponding resource with respect to rendering the web page at the corresponding sample time, the rendering status indicating whether the respective child resource was loaded at the corresponding sample time or not, and the time-based probability function determined by applying a weighting function to each resource sample of the plurality of resource samples to weight an impact of each resource sample on the probability generated by the time-based probability function for the individual child resource; and prefetching at least some of the one or more child resources in association with loading the web page and in accordance with the received plurality of hints.

27. The method of claim 26, further comprising:

storing the hints at the client machine, the hints comprising hinting probability functions calculated by the hinting machine to indicate probabilities over time that the resources will be requested as part of loading the web page at a time in the future, wherein the prefetching comprises computing a set of client-side hints for prefetching an associated set of resources as a function of a request time for the web page and the stored hinting probability functions, and prefetching the associated set of resource according to the set of client-side hints.

28. The method of claim 27, further comprising:

determining, by the client machine, that updated hints are unavailable from the hinting machine at the request time, wherein computing the set of client-side hints is performed in response to the determining.

* * * * *